(12) United States Patent
Wojsznis et al.

(10) Patent No.: US 10,061,286 B2
(45) Date of Patent: Aug. 28, 2018

(54) MODEL PREDICTIVE CONTROL USING WIRELESS PROCESS SIGNALS

(71) Applicant: FISHER-ROSEMOUNT SYSTEMS, INC., Round Rock, TX (US)

(72) Inventors: Wilhelm K. Wojsznis, Austin, TX (US); Terrence L. Blevins, Round Rock, TX (US); Mark J. Nixon, Round Rock, TX (US); John M. Caldwell, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 272 days.

(21) Appl. No.: 14/825,725

(22) Filed: Aug. 13, 2015

(65) Prior Publication Data
US 2016/0048119 A1    Feb. 18, 2016

Related U.S. Application Data

(60) Provisional application No. 62/036,928, filed on Aug. 13, 2014.

(51) Int. Cl.
| | | |
|---|---|---|
| *G05B 19/042* | (2006.01) | |
| *G05B 13/04* | (2006.01) | |
| *G05B 17/02* | (2006.01) | |

(52) U.S. Cl.
CPC ....... *G05B 19/0423* (2013.01); *G05B 13/048* (2013.01); *G05B 17/02* (2013.01);
(Continued)

(58) Field of Classification Search
CPC .. G05B 19/0423; G05B 13/048; G05B 17/02; G05B 2219/23292; G05B 2219/24075;
(Continued)

(56) References Cited

U.S. PATENT DOCUMENTS

| | | | |
|---|---|---|---|
| 5,522,224 A * | 6/1996 | Canney | F25J 3/04254 62/656 |
| 5,727,128 A * | 3/1998 | Morrison | G05B 17/02 706/14 |

(Continued)

OTHER PUBLICATIONS

Nixon et al., "Meeting Control Performance Over a Wireless Mesh Network," 4th IEEE Conference on Automation Science and Engineering, pp. 540-547 (2008).
(Continued)

*Primary Examiner* — Thomas C Lee
*Assistant Examiner* — Tri T Nguyen
(74) *Attorney, Agent, or Firm* — Marshall, Gerstein & Borun LLP

(57) ABSTRACT

A multiple-input/multiple-output control routine in the form of a model predictive control (MPC) routine operates with wireless or other sensors that provide non-periodic, intermittent or otherwise delayed process variable measurement signals at an effective rate that is slower than the MPC controller scan or execution rate. The wireless MPC routine operates normally even when the measurement scan period for the controlled process variables is significantly larger than the operational scan period of the MPC controller routine, while providing control signals that enable control of the process in a robust and acceptable manner. During operation, the MPC routine uses an internal process model to simulate one or more measured process parameter values without performing model bias correction during the scan periods at which no new process parameter measurements are transmitted to the controller. When a new measurement for a particular process variable is available at the controller, the model prediction and simulated parameter values are updated with model bias correction based on the new measurement value, according to traditional MPC techniques.

37 Claims, 13 Drawing Sheets

(52) U.S. Cl.
CPC ............. *G05B 2219/23292* (2013.01); *G05B 2219/24075* (2013.01); *G05B 2219/31121* (2013.01); *G05B 2219/33192* (2013.01); *G05B 2219/42058* (2013.01)

(58) Field of Classification Search
CPC ........... G05B 2219/31121; G05B 2219/33192; G05B 2219/42058
See application file for complete search history.

(56) References Cited

U.S. PATENT DOCUMENTS

| | | | |
|---|---|---|---|
| 6,496,786 B1 * | 12/2002 | Dieterle | G01D 5/145 324/166 |
| 7,519,012 B2 | 4/2009 | Tapperson et al. | |
| 7,587,252 B2 | 9/2009 | Blevins et al. | |
| 7,620,460 B2 | 11/2009 | Blevins et al. | |
| 2007/0112905 A1 | 5/2007 | Blevins et al. | |
| 2010/0204808 A1 * | 8/2010 | Thiele | G05B 17/02 700/30 |
| 2011/0276180 A1 * | 11/2011 | Seem | F25B 49/027 700/275 |
| 2012/0083917 A1 * | 4/2012 | Zhou | G05B 13/048 700/110 |
| 2013/0184837 A1 | 7/2013 | Blevins et al. | |

OTHER PUBLICATIONS

Search Report and Written Opinion for Application No. PCT/US2015/045051, dated Nov. 25, 2015.

* cited by examiner

|  | Upper Temp | Lower Temp | Bottom Temp | Prefrac Temp |
|---|---|---|---|---|
| Reflux Flow | $\frac{1}{1+10s}$ | 0 | 0 | 0 |
| Side Stream Flow | 0 | $\frac{1}{1+10s}$ | 0 | 0 |
| Reboiler Steam Flow | 0 | 0 | $\frac{1}{1+10s}$ | 0 |
| Liquid Split | 0 | 0 | 0 | $\frac{0.5}{1+10s}$ |
| Feed Flow | $\frac{0.2}{1+10s}$ | 0 | 0 | $\frac{0.2}{1+10s}$ |

FIG. 7

MODEL PREDICTIVE CONTROL USING WIRELESS PROCESS SIGNALS

RELATED APPLICATIONS

This is a regular filed application that claims priority to and the benefit of the filing date of U.S. Provisional Patent Application Ser. No. 62/036,928, entitled "Model Predictive Control Using Wireless Process Signals" which was filed on Aug. 13, 2014, the entire disclosure of which is hereby expressly incorporated by reference herein.

TECHNICAL FIELD

This patent relates to implementing model based control using non-periodic or intermittent control communications and, more particularly, to a device and method configured to robustly perform multiple-input/multiple-output, model based control, such as model predictive control, using non-periodically or intermittently updated process control signals delivered using, for example, a wireless communication network of a process control system.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Some process control systems, such as the DeltaV® system sold by Emerson Process Management, use function blocks or groups of function blocks referred to as modules located in the controller or in different field devices to perform control and/or monitoring operations. In these cases, the controller or other device is capable of including and executing one or more function blocks or modules, each of which receives inputs from and/or provides outputs to other function blocks (either within the same device or within different devices), and performs some process operation, such as measuring or detecting a process parameter, monitoring a device, controlling a device, or performing a control operation, such as the implementation of a proportional-derivative-integral (PID) control routine, a model predictive control (MPC) routine, etc. The different function blocks and modules within a process control system are generally configured to communicate with each other (e.g., over a bus) to form one or more process control loops.

Process controllers are typically programmed to execute a different algorithm, sub-routine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-input/single-output or a multiple-input/multiple-output control block, such as a proportional-integral-derivative (PID) or a fuzzy logic control function block, and an output block, such as an analog output (AO) function block. Control routines, and the function blocks that implement such routines, have been configured in accordance with a number of control techniques, including PID control, fuzzy logic control, and model-based techniques such as a smith predictor or model predictive control (MPC).

To support the execution of the routines, a typical industrial or process plant has a centralized control room communicatively connected with one or more process controllers and process I/O subsystems, which, in turn, are connected to one or more field devices. Traditionally, analog field devices have been connected to the controller by two-wire or four-wire current loops for both signal transmission and the supply of power. An analog field device that transmits a signal to the control room (e.g., a sensor or a transmitter) modulates the current running through the current loop, such that the current is proportional to the sensed process variable. On the other hand, analog field devices that perform an action under control of the control room is controlled by the magnitude of the current through the loop.

With the increased amount of data transfer, one particularly important aspect of process control system design involves the manner in which field devices are communicatively coupled to each other, to controllers and to other systems or devices within a process control system or a process plant. In general, the various communication channels, links and paths that enable the field devices to function within the process control system are commonly collectively referred to as an input/output (I/O) communication network.

The communication network topology and physical connections or paths used to implement an I/O communication network can have a substantial impact on the robustness or integrity of field device communications, particularly when the network is subjected to adverse environmental factors or harsh conditions. These factors and conditions can compromise the integrity of communications between one or more field devices, controllers, etc. The communications between the controllers and the field devices are especially sensitive to any such disruptions, inasmuch as the monitoring applications or control routines typically require periodic updates of the process variables for each iteration of the routine. Compromised control communications could therefore result in reduced process control system efficiency and/or profitability, and excessive wear or damage to equipment, as well as any number of potentially harmful failures.

In the interest of assuring robust communications, I/O communication networks used in process control systems have historically been hardwired. Unfortunately, hardwired networks introduce a number of complexities, challenges and limitations. For example, the quality of hardwired networks may degrade over time. Moreover, hardwired I/O communication networks are typically expensive to install, particularly in cases where the I/O communication network is associated with a large industrial plant or facility distributed over a large area, for example, an oil refinery or chemical plant consuming several acres of land. The requisite long wiring runs typically involve substantial amounts of labor, material and expense, and may introduce signal degradation arising from wiring impedances and electromagnetic interference. For these and other reasons, hardwired I/O communication networks are generally difficult to reconfigure, modify or update.

In some cases, wireless I/O communication networks have been used to alleviate some of the difficulties associated with hardwired I/O networks. For example, U.S. Pat. No. 7,519,012, entitled "Distributed Control System for Controlling Material Flow Having Wireless Transceiver Connected to Industrial Process Control Field Device to Provide Redundant Wireless Access," the entire disclosure of which is hereby expressly incorporated by reference herein, discloses a system utilizing wireless communications to augment or supplement the use of hardwired communications.

Reliance on wireless communications for control-related transmissions has traditionally been limited due to, among other things, reliability concerns. As described above, modern monitoring applications and process control depend upon reliable data communication between the controller and the field devices to achieve optimum control levels. Moreover, typical controllers execute control algorithms at fast rates to quickly correct unwanted deviations in the process. Undesirable environmental factors or other adverse conditions may create intermittent interferences that impede or prevent the fast communications necessary to support such execution of monitoring and control algorithms. Fortunately, wireless networks have become much more robust over the last decade, enabling the reliable use of wireless communications in some types of process control systems.

However, power consumption is still a complicating factor when using wireless communications in process control applications. Because wireless field devices are physically disconnected from the I/O network, the field devices typically need to provide their own power source. Accordingly, field devices may be battery powered, draw solar power, or pilfer ambient energy such as vibration, heat, pressure, etc. For these devices, energy consumed for data transmission may constitute a significant portion of total energy consumption. In fact, more power may be consumed during the process of establishing and maintaining a wireless communication connection than during any other important operation performed by the field device, such as the steps taken to sense or detect the process variable being measured. To reduce power consumption in wireless devices and thus prolong battery life, it has been suggested to implement a wireless process control system in which the field devices, such as sensors, communicate with the controller in a non-periodic or intermittent manner. In one case, the field devices may communicate with or send process variable measurements to the controller only when a significant change in a process variable has been detected, or once per defined communication time period when no significant change is detected, leading to non-periodic or intermittent communications with the controller.

Unfortunately, typical process control techniques are designed with the assumption that a new process variable measurement will be available each time the controller performs a new control signal calculation so that the controller is responding to the most recently measured value of the process variable being controlled. Using wireless communications in the manner described above, however, especially to send controlled variable measurements to the controller, may result in situations in which the controller does not receive a new control signal update or feedback measurement for each controller scan. As a result, typical or standard control routines when used with wireless or non-periodic updates do not operate as smoothly or as accurately as control routines that receive periodic or wired updates.

This problem has been addressed in simple, single-input/single-output control routines, such as those that use proportional, integral, derivative (PID) control routines. For example, one control technique that has been developed for PID control routines to handle non-periodic process variable measurement updates uses a control system that provides and maintains an indication of an expected process response to the control signal produced by the controller between the infrequent, non-periodic measurement updates. An expected process response may be developed by a mathematical model that calculates an expected process response to a control signal for a given measurement update. One example of this technique is described in U.S. Pat. No. 7,587,252, entitled, "Non-Periodic Control Communications in Wireless and Other Process Control Systems," the entire disclosure of which is hereby expressly incorporated by reference herein. In particular, this patent discloses a control system having a filter that generates an indication of an expected process response to a control signal upon the receipt of a non-periodic process variable measurement update and that maintains the generated indication of the expected process response until the arrival of the next non-periodic process variable measurement update. As another example, U.S. Pat. No. 7,620,460, entitled "Process Control With Unreliable Communications," the entire disclosure of which is hereby expressly incorporated by reference herein, discloses a system that includes a filter that provides an indication of an expected response to the control signal but further modifies the filter to incorporate a measurement of the time that has elapsed since a last non-periodic measurement update, thereby to generate a more accurate indication of the expected process response.

However, many control applications use other types of control routines, besides single-input/single-output routines like PID control routines. For example, model predictive control (MPC) is becoming widely used in many processes. In fact, over the years, MPC has proven to be the most effective advanced control technology and has been installed in thousands of plants for control of multi-variable interactive processes. Usually MPC operation is integrated with a linear or non-linear optimizer delivering significant economic benefits, observed as increased productivity and improved product quality.

As indicated above, however, with the rapid spread of wireless measurements in the process industry, many measurements used in MPC system could be wireless. To use these signals effectively, however, the MPC routine needs to be able to operate partially or completely using non-periodic or intermittent measurements such as those provided by certain types of wireless communication systems. Currently, no such MPC routine is known.

At best, MPC operation has, in the past, been configured to account for short periods of time during which feedback measurements are not available due to detected faults in the communication network. For example, in some recent MPC designs, a simulated measurement of a process control variable as produced by the MPC was used to facilitate the operation of the MPC controller over a predefined period of time when a measurement signal for that process control variable was indicated to be "bad" due to some detected fault in the system, such as due to the loss of communications with the measurement device, the measurement device detecting a problem with the measurement, etc. In these cases, when the measurement signal had a "bad" status, the MPC routine would operate using a simulated measurement produced by the MPC routine for only a limited period of time before changing from an automatic control mode to a manual or local control mode, in which a user or other control routine had to actively monitor or assist the MPC controller in operation. In these cases, use of the simulated measurement was only performed for a limited period of time to delay switchover from the automatic control mode (in which the MPC routine was used to perform control) to a manual or local mode (in which the MPC routine was not the primary controller). Moreover, this technique was performed only in response to a detected fault of the system, and not as a standard course during operation of the process. Thus, in this case, the status of the analog input (AI) measurement used in the MPC configuration as a controlled or constrained variable (CV) ("good" or "bad") defined whether the MPC used the AI measurement or a simulated process value, and the maximum time for using a simulated process value and the type of MPC failure action (e.g., the switch over to a local or manual mode) if the AI output status became "bad" was defined during the MPC configuration process. However, this system was not able to consistently operate an MPC routine in response to regular intermittent or non-periodic process measurement signals during normal and ongoing operation of the process.

SUMMARY

A multiple-input/multiple-output control routine, such as a model predictive control (MPC) routine, operates with wireless or other sensors that provide non-periodic, intermittent or otherwise delayed process variable measurement signals at a rate that is slower than the MPC controller scan or execution rate. In particular, the wireless MPC controller routine operates when the measurement scan period is larger or even significantly larger than the operational scan period of the MPC routine, while providing control signals that enable the MPC routine to control the process in a robust and acceptable manner. Thus, the MPC routine operates when wireless or other process variable measurements are delivered to the MPC at irregular intervals, in a non-periodic manner, or at a rate that is slower than the scan or operational rate of the MPC controller itself.

Generally speaking, the new MPC routine uses an internal process model to simulate one or more measured process parameter values during each MPC scan period, including both when a new process measurement value is available, and when no new process parameter measurement value is available at the controller. However, the MPC routine operates to produce the simulated process parameters values used in control without performing model bias correction based on the most recently measured process variable value when no new measurement values for the process variable are available. On the other hand, when a new measurement for a particular process variable is available, the model prediction and simulated parameter values are updated with a model bias correction based on the new measurement value and traditional MPC techniques. This technique provides a continuity of MPC operation, independently of irregular process variable measurements, because the MPC routine is able to use simulated measurement values for the process variable measurements. In one case, the process control system may be configured to provide a measurement status "constant" that indicates a non-error condition in which no new measurement for the process variable has been received, and which causes the MPC routine to use its own uncorrected model output for parameter simulation during the MPC scan. As such, using this technique, wireless or other measurement inputs may include a "constant" status in the scan periods when a new measurement is not delivered and may include a "good" status (also a non-error status) in the scan periods at which a new measurement has been received. In this manner, non-receipt of a measurement signal for a scan or execution cycle does not result in the controller in going into a "bad" or other error status, which ultimately results in switching of the mode of the controller out of an automatic mode. Another advantage of this approach is that the MPC controller may use the same model for both wired and wireless control.

In a further case, the MPC control routine described herein may be used to implement a multi-rate control routine that implements or uses one or more process models at different effective scan rates for the process while performing control of various different controlled variables based on feedback signals received at different update rates. Thus, the multi-rate MPC controller may operate to perform simultaneous control of multiple different process variables for which updates are received at different measurement rates. That is, the multi-rate MPC controller may perform controller update operations for one controlled parameter based on measurement signals received for the one controlled parameter at a faster rate than measurements are received for other ones of the process variables being controlled. Here, the MPC control routine may use the fastest measurements (received at the fastest update rate) for one controlled parameter at every MPC scan, while using slower measurements received at slower update rates for other controlled variables by using simulated process variable values for the other controlled variables at each controller scan at which a new slower measurement is not available, i.e., if a measurement update of the fast scan rate (associated with a first one of the controlled variables) does not coincide with a measurement update of the slower scans rates (associated with others of the controlled variables). When the fastest scan or update rate coincides with one or more of the slower scan or update rates, the received measurements are used for both models to produce new updated predicted simulated values used for control.

BRIEF DESCRIPTION OF THE DRAWINGS

FIG. 7 depicts a simplified process model that may be used to perform control variable prediction in the MPC controller of FIG. 5.

DETAILED DESCRIPTION

A new control technique that is especially adapted to be used in model based controllers, including for example, multiple-input/multiple-output, model based controllers, such as model predictive controllers (MPCs), enables a controller that receives process measurement signals as feedback signals in a non-periodic, intermittent or slow manner to still accurately and acceptably control a process, and thus to provide for robust process control dynamics. In particular, the new control routine implements a feedback loop that corrects for model prediction error for each of one or more of the various process parameters or process variables being measured/controlled only when a new measurement value for the process parameter or process variable has been received, and applies no or previously generated or modified correction values at other times, i.e., when no new measurement value has been received. As a result, the process control routine uses the measurement value to create a new process control signal during the controller scans at which a new measurement value is available and uses a previously predicted process variable, as produced by an internal process model of the control routine, to create a new process control signal during the controller scans at which a new measurement value for the controlled process variable or process parameter is not available. This control routine enables robust and accurate control of a process even when measurements of the process variables being controlled (the controlled variables) are received at the controller in a non-periodic, intermittent or slow manner, e.g., at a rate that is slower (and even substantially slower) than the scan rate of the process controller itself.

Figure 1:
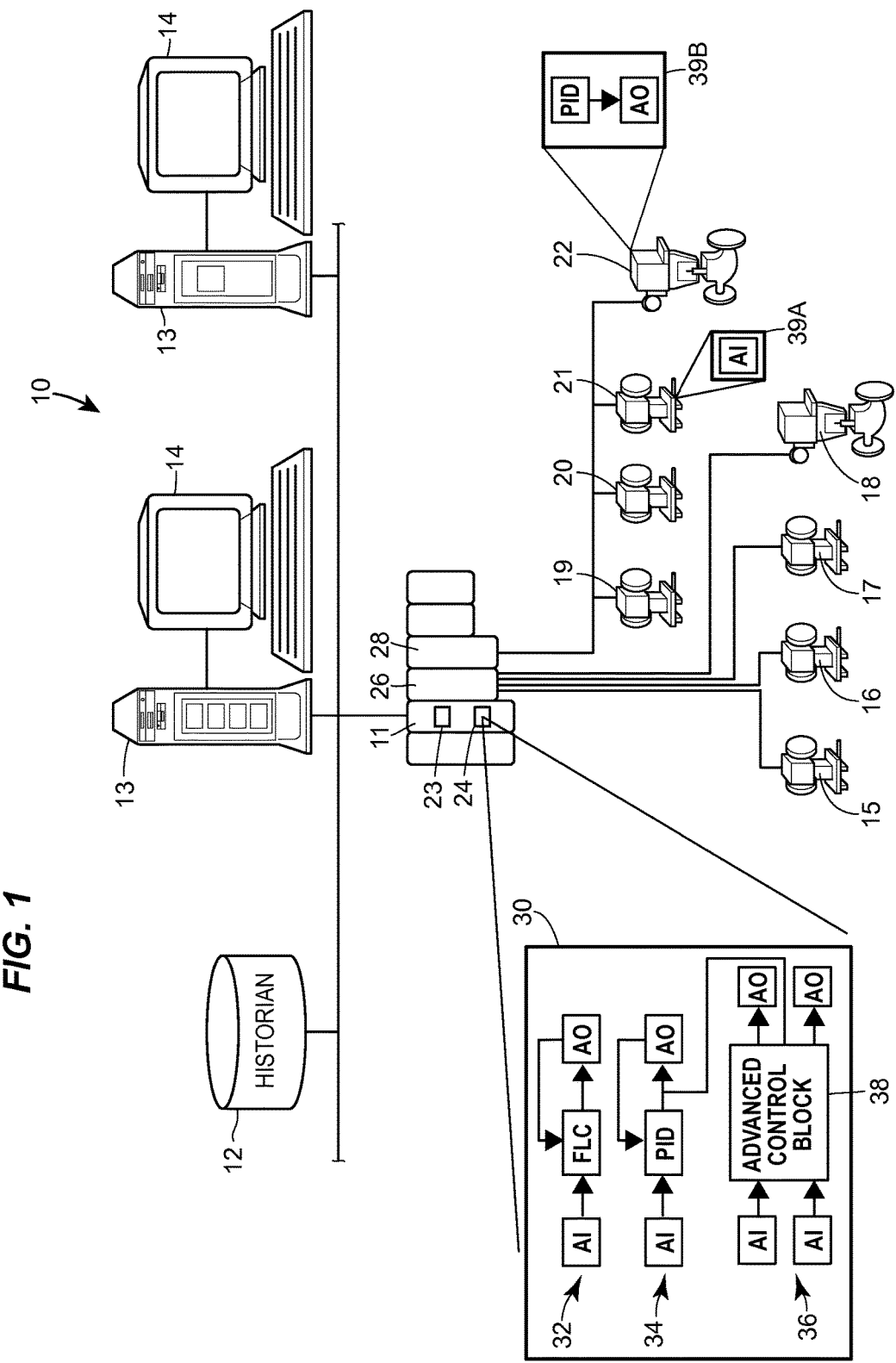
FIG. 1 is a block diagram of an example, periodically updated, hard-wired process control system.

A process control system 10 such at that illustrated in FIG. 1 may be used to implement the control methodology described herein. In this example, the process control system 10 includes a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data. The controller 11 is, in FIG. 1, communicatively connected to the field devices 15-22 using a hardwired communication network and communication scheme.

Generally, the field devices 15-22 may be any types of devices, such as sensors, valves, transmitters, positioners, etc., while the I/O cards 26 and 28 may be any types of I/O devices conforming to any desired communication or controller protocol. The controller 11 includes a processor 23 that implements or oversees one or more process control routines (or any module, block, or sub-routine thereof) stored in a memory 24. Generally speaking, the controller 11 communicates with the devices 15-22, the host computers 13 and the data historian 12 to control a process in any desired manner. Moreover, the controller 11 implements a control strategy or scheme using what are commonly referred to as function blocks, wherein each function block is an object or other part (e.g., a subroutine) of an overall control routine that operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs a PID, an MPC, a fuzzy logic, etc., control technique, or an output function which controls the operation of some device, such as a valve, to perform some physical function within the process control system 10. Of course, hybrid and other types of function blocks exist and may be utilized herein. The function blocks may be stored in and executed by the controller 11 or other devices as described below.

As illustrated by the exploded block 30 of FIG. 1, the controller 11 may include a number of single-loop control routines, illustrated as control routines 32 and 34, and, if desired, may implement one or more advanced control loops, illustrated as a control loop 36. Each such control loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to one or more AI function blocks and outputs communicatively connected to one or more AO function blocks, although the inputs and outputs of the advanced control block 38 may be connected to any other desired function blocks or control elements to receive other types of inputs and to provide other types of control outputs. The advanced control block 38 may implement any type of multiple-input, multiple-output control scheme, and/or may implement a process model based control routine, and thus may constitute or include a model predictive control (MPC) block, a neural network modeling or control block, a multi-variable fuzzy logic control block, a real-time-optimizer block, etc. It will be understood that the function blocks illustrated in FIG. 1, including the advanced control block 38, can be executed by the stand-alone controller 11 or, alternatively, can be located in and executed by any other processing device or control element of the process control system 10, such as one of the workstations 13 or one of the field devices 19-22. As an example, the field devices 21 and 22, which may be a transmitter and a valve, respectively, may execute control elements for implementing a control routine and, as such, include processing and other components for executing parts of the control routine, such as one or more function blocks. More specifically, the field device 21 may have a memory 39A for storing logic and data associated with an analog input block, while the field device 22 may include an actuator having a memory 39B for storing logic and data associated with a PID, an MPC or other control block in communication with an analog output (AO) block, as illustrated in FIG. 1.

Figure 2:
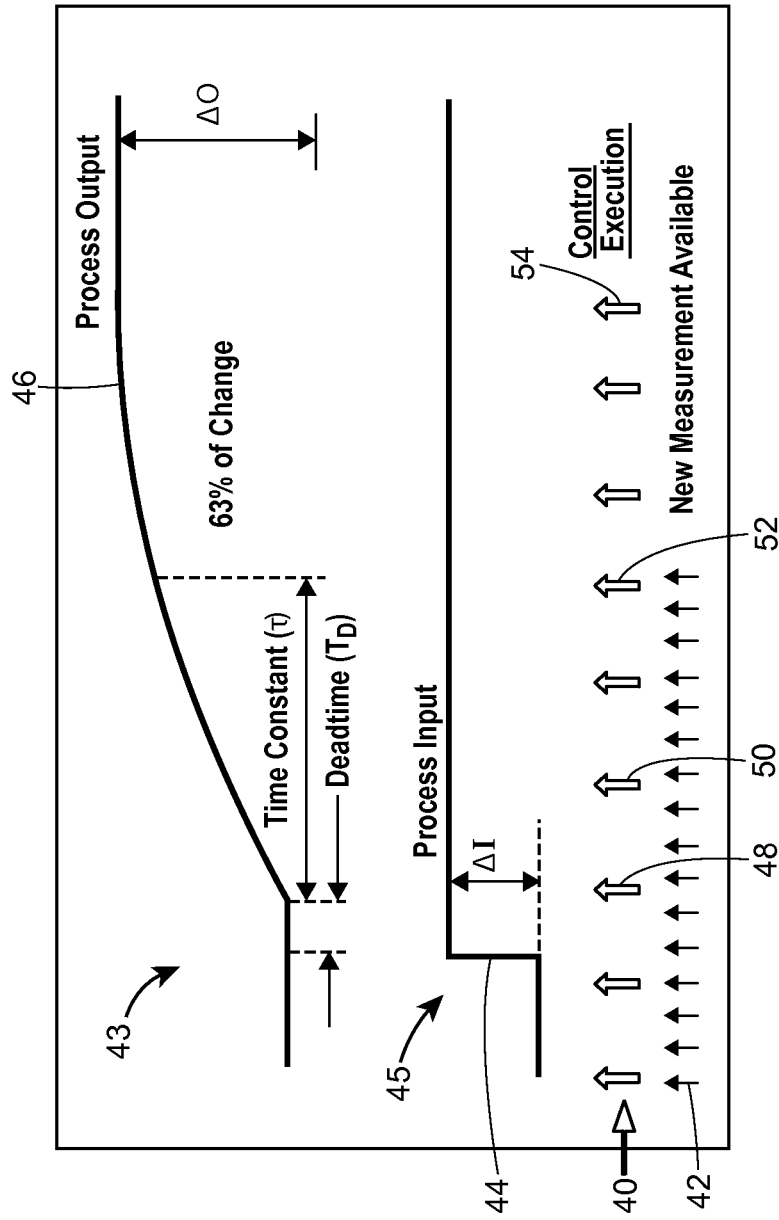
FIG. 2 is graph illustrating a process output response to a process input for an example periodically updated, hard-wired process control system.

The graph of FIG. 2 generally illustrates a process output developed in response to a process input for a process control system based on the implementation of one or more of the control loops 32, 34 and 36 (and/or any control loop incorporating the function blocks residing in the field devices 21 and 22 or other devices). The control routine being implemented generally executes in a periodic manner over a number of controller iterations (controller scans) with the times of the control routine execution being indicated in FIG. 2 along the time axis by the thick arrows 40. In a conventional case, each control routine iteration 40 is supported by an updated process measurement of the process variables being controlled (the controlled variables) indicated by the thin arrows 42 provided by, for instance, a transmitter or other field device. As illustrated in FIG. 2, there are typically multiple periodic process measurements 42 made and received by the control routine between each of the periodic control routine execution times 40 (also called controller scan times). To avoid the restrictions associated with synchronizing the measurement value with control execution, many known process control systems (or control loops) are designed to over-sample the process variable measurement by a factor of 2-10 times. Such over-sampling helps to ensure that the process variable measurement is current for use in the control scheme during each control routine execution iteration or scan. Also, to minimize control variations, conventional designs specify that feedback based control should be executed 4-10 times faster than the process response time. The process response time is depicted in a process output response curve 43 of the graph of FIG. 2 as being the time associated with a process time constant ($\tau$) (e.g., 63% of the process variable change) plus a process delay or deadtime ($T_D$) after an implementation of a step change 44 in a process input (shown in the lower line 45 of FIG. 2). In any event, to satisfy these conventional design requirements, the process measurement value updates (indicated by the arrows 42 of FIG. 2) have been sampled and provided to the controller at a much faster rate than the control routine execution or scan rate (indicated by the arrows 40 of FIG. 2), which, in turn, is much faster than the process response time.

Figure 3:
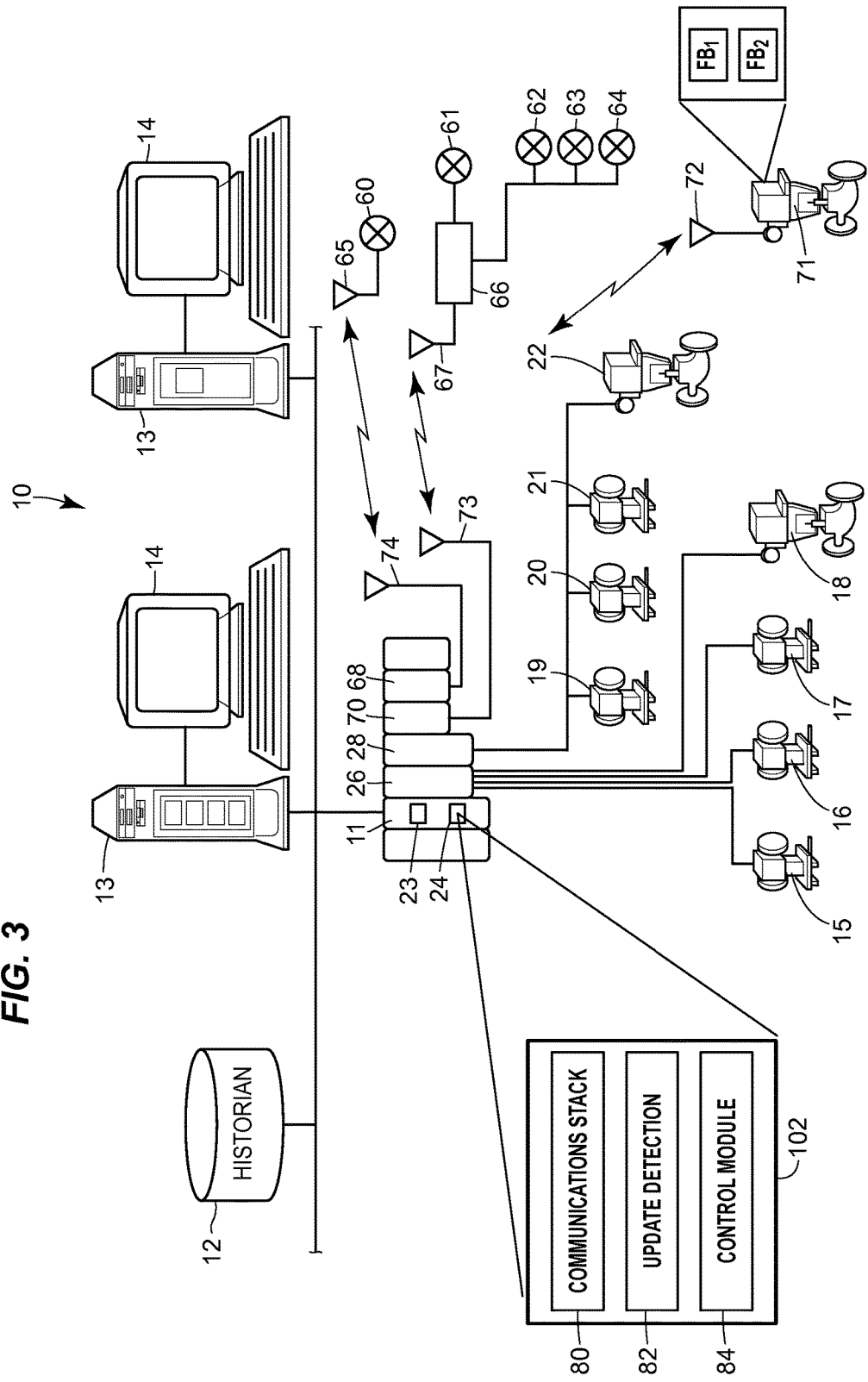
FIG. 3 is a block diagram illustrating an example of a wireless process control system having a controller that receives non-periodic feedback input from one or more wireless sensors.

However, obtaining frequent and periodic measurement samples from the process may not be practical or even possible when a controller is operating in process control environment in which, for example, the controller receives measurements wirelessly, intermittently, and/or non-periodically from one or more field devices. Such measurements may include lab measurements or lab analyses made off-line. In particular, in these cases, the controller may only be able to receive non-periodic process variable measurements, and/or the time between the non-periodic or even periodic process variable measurements may be greater than the control routine execution rate or scan rate (indicated by the arrows 40 of FIG. 2). FIG. 3 depicts an exemplary wireless process control system 10 that may implement the use of non-periodic, wireless communications of process control data or process variable measurements at a controller 11.

The control system 10 of FIG. 3 is similar in nature to the control system 10 of FIG. 1, with like elements being numbered the same. However, the control system 10 of FIG. 3 includes a number of field devices 60-64 and 71 that are wirelessly communicatively coupled to the controller 11 and potentially to one another. As illustrated in FIG. 3, the wirelessly connected field device 60 is connected to an antenna 65 and cooperates to communicate wirelessly with an antenna 74 which is, in turn, coupled to a wireless I/O device 68 connected to the controller 11. Moreover, the field devices 61-64 are connected to a wired-to-wireless conversion unit 66 which is, in turn, connected to an antenna 67. The field devices 61-64 communicate wirelessly through the antenna 67 with an antenna 73 connected to a further wireless I/O device 70 which is also connected to the controller 11. As also illustrated in FIG. 3, the field device 71 includes an antenna 72 which communicates with one or both of the antennas 73 and 74 to thereby communicate with the I/O devices 68 and/or 70. The I/O devices 68 and 70 are, in turn, communicatively connected to the controller 11 via a wired backplane connection (not shown in FIG. 3). In this case, the field devices 15-22 remain hardwired to the controller 11 via the I/O devices 26 and 28.

The process control system 10 of FIG. 3 generally uses the wireless transmission of data measured, sensed by or computed by the transmitters 60-64 or other control elements, such as the field device 71, as described below. In the control system 10 of FIG. 3, it will be assumed that new process variable measurements or other signal values are transmitted to the controller 11 by the devices 60-64 and 71 on a non-periodic or intermittent basis, such as when certain conditions are satisfied. For example, a new process variable measurement value may be sent to the controller 11 when the process variable value changes by a predetermined amount with respect to the last process variable measurement value sent by the device to the controller 11 or at least once per a predefined update rate that is typically much slower than the scan rate of the controller 11. Of course, other manners of determining when to send process variable measurement values in a non-periodic manner may be implemented as well or instead.

As will be understood, each of the transmitters 60-64 of FIG. 3 may transmit a signal indicative of a respective process variable (e.g., a flow, a pressure, a temperature or a level signal) to the controller 11 for use in one or more control loops or routines or for use in a monitoring routine. Other wireless devices, such as the field device 71, may receive process control signals wirelessly, and/or be configured to transmit other signals indicative of any other process parameter. Generally speaking, as illustrated in FIG. 3, the controller 11 includes a communications stack 80 that executes on a processor to process the incoming signals, a module or a routine 82 that executes on a processor to detect when an incoming signal includes a measurement update, and one or more control modules 84 which execute on a processor to perform control based on the measurement updates. The detection routine 82 may generate a flag, status, or other signal to denote that data being provided via the communications stack 80 includes a new process variable measurement or other type of update for any particular process variable used in the control routine. The new data and the update flag or status parameter may then be provided to one or more of the control modules 84 (which may be function blocks) which are then executed by the controller 11 at a predetermined periodic execution rate, as described in further detail below. Alternatively, or in addition, the new data and the update flags or status parameters may be provided to one or more monitoring modules or applications executed in the controller 11 or elsewhere in the control system 10.

The wireless (or other) transmitters of FIG. 3 generally result in non-periodic, which includes irregular or otherwise less frequent data transmissions, or in periodic data transmissions provided at a slow periodic rate, between the field devices 60-64 and 71 (some of which are transmitters) and the controller 11. As noted above, however, the communication of measurement values from the field devices 15-22 to the controller 11 has traditionally been structured to be performed in a periodic manner that provides oversampling of process variables to, in turn, support the periodic execution of the control routine(s) within the controller 11 wherein a new measurement value is available at each controller scan. As a result, the control routines in the controller 11 are generally designed for periodic updates of the process variable measurement values used in the feedback loops of the controller 11.

To accommodate the non-periodic or otherwise unavailable measurement updates (and other unavailable communication transmissions) introduced by the wireless communications between some of the field devices and the controller 11, the control and monitoring routine(s) of the controller 11, and in particular, internal model based, predictive or multiple-input/multiple-output control routines may be restructured or modified as described below to enable the process control system 10 to function properly when using non-periodic or other intermittent updates, and especially when these updates occur less frequently than the execution or scan rate of the controller 11.

Figure 4:
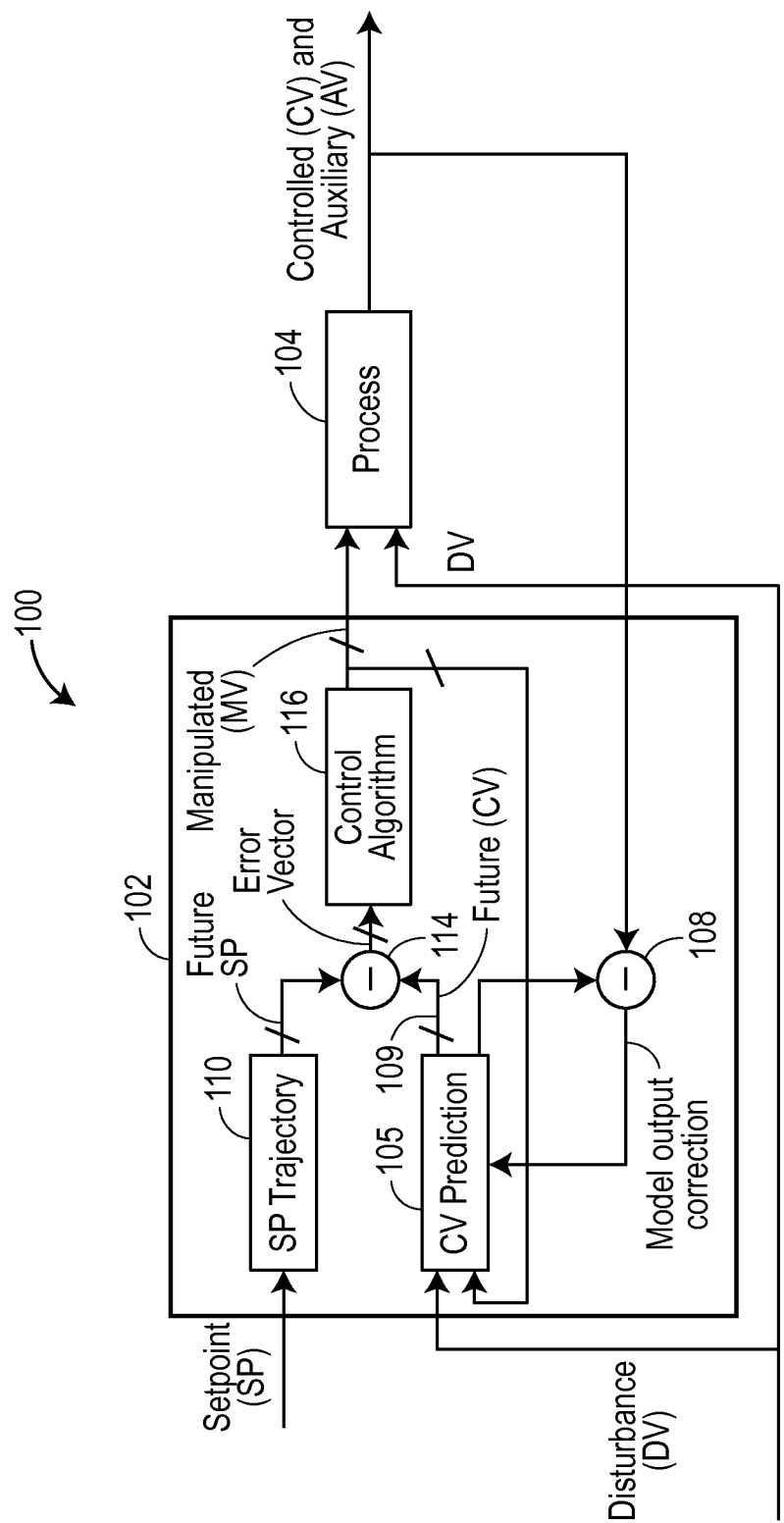
FIG. 4 is a block diagram of an example MPC controller used in a wired environment.

The new control methodology will be explained below in the example implementation of an MPC routine. However, this control methodology can be used in other types of model based controllers and other types of multiple-input/multiple-output controllers as well. To assist in the explanation of the new control methodology, FIG. 4 is provided first to illustrate a typical MPC controller configuration that uses standard MPC control techniques with regular (periodic) and oversampled measurements signals for the process variables being controlled, i.e., the controlled variables. In this context, oversampled measurements signals includes a situation in which one new measurement signal is provided to the controller or is available during each controller scan. The control scheme implemented by the controller of FIG. 4 (which may be the controller 11 of FIGS. 1 and 3 or a control element of a field device, e.g., one of the wireless field devices of FIG. 3, etc.) generally includes the functionality of the communications stack 80, the update detection module 82 and one or more of the control modules 84 illustrated and described in connection with FIG. 3.

More particularly, FIG. 4 schematically illustrates a control loop 100 that includes a multiple-input/multiple-output control routine or controller 102, in the form of an MPC routine, to simultaneously control multiple controlled variables (CVs) of a process 104, based on measurements taken for these controlled variables and provided back to the MPC controller 102. In particular, the control loop 100 of FIG. 4 implements a multi-variable MPC controller unit 102 (communicatively coupled to the process 104) that may be implemented by the advanced control block 38 of FIG. 1 or 3 to perform multivariable process control. In this case, the MPC controller 102 unit may be used to implement a Dynamic Matrix Control (DMC) control technique. As illustrated in FIG. 4, the controller 102 produces a set of one or more manipulated variables (MVs) that are provided to other function blocks (not shown in FIG. 4) which, in turn, are connected to control inputs of the process 104. The MPC controller 102 may include or implement any standard MPC routine or procedure, typically having the same number of inputs as outputs, although that requirement is not necessary. The MPC controller 102 receives, as inputs, a set of N controlled variables (CVs), which have defined constraint limits and may have defined set points, and auxiliary variables (AVs), which have defined constraint limits only. The controlled variables CVs and the auxiliary variables AVs typically constitute vectors of values, as measured within the process 104. Lines with vector values are generally indicated in the figures with a hash line there-through. The MPC controller 112 also receives, as inputs, a set of disturbance variables (DVs), which are known or expected changes or disturbances provided to the process 104 at some time in the future, and a set of steady state target control and auxiliary variables ($CV_T$) and ($AV_T$), indicated as set points (SPs) provided from, for example, an optimizer (not shown). Alternatively, a user or any other source may define or provide the controlled variable target values $CV_T$. The MPC controller 102 uses these inputs to create the set of M manipulated variable signals (MVs) in the form of control signals and delivers the manipulated variable signals MVs to the control inputs of the process 104. The manipulated variable signals MVs are control signals which may be inputs related to controlling the operation of valve actuators, burners, pumps, etc., or any other device that effects the physical operation of the process 104.

Still further, the MPC controller 102 may calculate and produce a set of predicted steady state control variables ($CV_{SS}$) and auxiliary variables ($AV_{SS}$) along with a set of predicted steady state manipulated variables ($MV_{SS}$) representing the predicted values of the control variables (CVs), the auxiliary variables (AVs) and the manipulated variables (MVs), respectively, at a control horizon. These variables may be used in one or more MPC optimization routine(s) (not shown) to develop the target control and auxiliary variables $CV_T$ and $AV_T$ (e.g., the set points SP) in order to drive the process 104 to an optimal operating state.

No matter how developed, the target control and auxiliary variables $CV_T$ and $AV_T$ are provided as inputs to the MPC controller 102 as set points SP, and as noted previously, the MPC controller 102 uses these target values to determine a new set of steady state manipulated variables $MV_{SS}$ (over the control horizon) which drives the current control and manipulated variables CV and AV to the target values $CV_T$ and $AV_T$ at the end of the control horizon. Of course, as is known, the MPC controller 102 changes the manipulated variables in steps in an attempt to reach the steady state values for the steady state manipulated variables $MV_{SS}$ which, theoretically, will result in the process obtaining the target control and auxiliary variables $CV_T$ and $AV_T$. Because the MPC controller 102 operates as described above during each controller scan, the target values of the manipulated variables may change from scan to scan and, as a result, the MPC controller 102 may never actually reach any particular one of these sets of target manipulated variables MV, especially in the presence of noise, unexpected disturbances, changes in the process 104, etc.

As is typical, the MPC controller 102 includes a control variable prediction process model 105 (also called a "controller model" or a "prediction process model"), which may be any type of model used in any of the various different MPC control techniques. For example, the model 105 may be an N by M+D step response matrix (where N is the number of control variables CV plus the number of auxiliary variables AV, M is the number of manipulated variables MV and D is the number of disturbance variables DV). However, the model 105 may be a first order, a second order, a third order, etc., predictive or first principles model, a state-space model, a convolution process model, or any other type of process model. The controller model 105 may be determined from process upset tests using time series analysis techniques that do not require a significant fundamental modeling effort, or may be determined using any other known process modeling techniques, including those which superimpose one or more sets of linear models or non-linear models. In any event, the control prediction process model 105 produces an output defining a previously calculated prediction for each of the control and auxiliary variables CV and AV. A summer 108 subtracts these predicted values for the current time from the actual measured values of the control and auxiliary variables CV and AV at the current time, as sensed or measured within the process 104, to produce an error or correction vector (also known as a set of residuals). The set of residuals, typically referred to as the prediction error, defines a bias or offset error of the model 105 and is used to correct the predictions of the model 105.

During operation, the control prediction process model 105 uses the MV and DV inputs and the residuals to predict a future control parameter for each of the controlled variables and auxiliary variables CV and AV over the control horizon and provides the future predicted values of the controlled variables and potentially the auxiliary variables (in vector form) on the line 109. The control prediction process model 105 also produces the predicted steady state values of the control variables and the auxiliary variables $CV_{SS}$ and $AV_{SS}$ discussed above. Thus, the block 105 makes predictions of the values for each of the CVs and AVs over the time to the prediction horizon.

Moreover, a control target block 110 determines a control target vector or set point vector for each of the N target control and auxiliary variables $CV_T$ and $AV_T$ provided thereto by, for example, a user or other optimization application. The control target block 110 may include a trajectory filter that defines the manner in which control and auxiliary variables are to be driven to their target values over time. The control target block 110 uses this filter and the target variables $CV_T$ and $AV_T$ as defined by the set points SP to produce a dynamic control target vector for each of the control and auxiliary variables defining the changes in the target variables $CV_T$ and $AV_T$ over time period defined by the control horizon time. A vector summer 114 then subtracts the future control parameter vector for each of the simulated or predicted control and auxiliary variables CV and AV on the line 109 from the dynamic control vectors produced by the block 110 to define a future error vector for each of the control and auxiliary variables CV and AV. The future error vector for each of the control and auxiliary variables CV and AV is then provided to an MPC control algorithm 116 which operates to select the manipulated variable MV steps that minimize, for example, the integrated squared error (ISE) or integrated absolute error (IAE), over the control horizon.

In some embodiments, the MPC control algorithm 116 may use an N by M control matrix developed from relationships between the N control and auxiliary variables input to the MPC controller 102 and the M manipulated variables output by the MPC controller 102 if desired. More particularly, the MPC control algorithm 116 has two main objectives. First, the MPC control algorithm 116 tries to minimize CV control error with minimal MV moves, within operational constraints and, second, tries to achieve optimal steady state MV values and the target CV values calculated directly from the optimal steady state MV values.

The state equations for a typical model predictive controller may be expressed as:

$$\hat{x}_{k+1} = Ax_k + Bu_k \quad (1)$$
$$k = 0, 1, 2, \ldots$$

$$\hat{y}_k = C\hat{x}_k \quad (2)$$

$$\min_{u^N} \sum_{j=0}^{\infty} (y_{k+j}^T Q y_{k+j} + u_{k+j}^T R u_{k+j} + \Delta u_{k+j}^T S \Delta u_{k+j}) \quad (3)$$

where Q, R, S are the penalty weights for error, controller move and incremental move, respectively, $x_k$ is the model state matrix, $y_k$ is the process output and $u_k$ is the controller output. Because the Q, R and S penalty vectors are inherently separate, MPC controllers generally do not have a performance tradeoff between set point tracking and disturbance rejection. However, MPC controllers still need to be tuned for a specific multivariable process control objective. While the process model is always matched with the internal structure of an MPC controller (e.g., process state space with the state space MPC formulation), additional tuning parameters determine the behavior with respect to set point change and disturbance rejection.

In particular, the penalty vectors can be used to emphasize one variable over others in accordance with the control objective for the specific process as defined by the end user. If model mismatch is suspected, the penalty vectors Q and R can also be used to make the controller more robust (i.e., to detune the controller). However, methods such as funnel control or reference trajectory have a more obvious impact on robustness as they effectively filter the error vector, which is why these methods are the preferred means for engineers and operators to tune model predictive controllers in industrial process applications. Because a model predictive controller inherently "matches" the process, the control moves are always optimal for the specific process model. This fact means that the controller can only be detuned (according to physical limitations on the final control elements) and never tuned very aggressively. For example, a valve opening speed can never be infinite and, therefore, the value of R can never realistically be zero. It is known that the disturbance rejection of industrial MPC controllers lags behind that of PID controllers when PID controllers are specifically tuned for disturbance rejection. Recent MPC improvements in the area of state update have closed that performance gap if an observer model which is used in the MPC routine is assumed to be known perfectly. However, in the presence of model mismatch, the control performance (e.g., measured in IAE) of a PID controller is still better than that of an MPC controller with the best possible tuning. None-the-less, MPC techniques with an observer can be used to improve the feedback control performance and typically perform better than DMC techniques in this regard.

In any event, the operation of the MPC controller 102 in FIG. 4 assumes that a new process variable measurement is available during each controller scan or execution operation of the model 105 which produces a new set of controlled variable predictions over the time horizon. Operation of this controller, when new process variable measurements for the controlled process variables (CVs) are not available at each new controller scan, results in a controller that uses stale process variable data to perform control.

Figure 5:
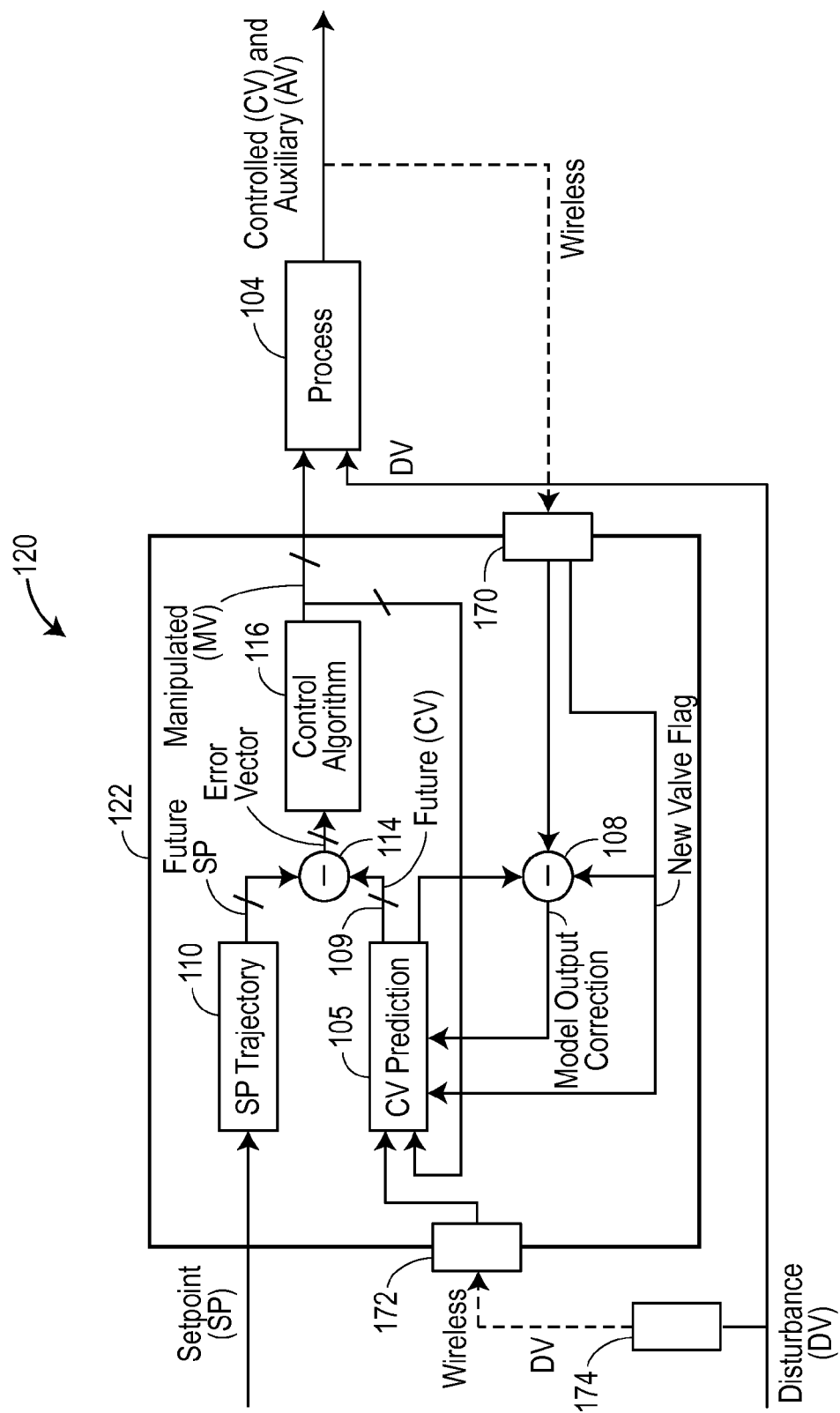
FIG. 5 is a block diagram of a typical MPC controller coupled within a process that includes wireless communications, in which the MPC controller is configured to use the wireless or other intermittently received process variable measurements to implement control.

FIG. 5 illustrates a similar process control loop 120 as that illustrated in FIG. 4 but that operates to perform control in the presence of intermittent, non-periodic or slow (periodic or non-periodic) process variable measurements related to the controlled process variables (CVs) and/or auxiliary process variables (AVs) being controlled by a controller. In particular, the control loop 120 includes a process controller 122 having many of the same elements as the controller 102 of FIG. 4, which elements are numbered the same. However, in the case of the controller 122 of FIG. 5, the measurements of the controlled process variables are illustrated as being communicated to the controller 122 by a wireless communication link, such as any of those in FIG. 3. The wireless communication links are illustrated in FIG. 5 by dotted lines. In this case, it is assumed that these measurements are received non-periodically, intermittently or at a periodic or non-periodic rate that is slower than the scan or execution rate of the controller 122.

More particularly, as illustrated in FIG. 5, the wireless process measurements of the controlled variables CVs are provided to an interface 170 that determines, for each controlled or auxiliary process variable, whether a new measurement value has been received for the process variable. If so, the interface 170 may set a new value flag indicating as such (on a process variable by process variable basis). In an alternative embodiment, the interface 170 may set a status of the process variable measurement or signal, as stored in the controller 120, as a "good" status or other status to indicate that the current measurement value is associated with a newly received measurement. (In this case, the status parameter may act as a new value flag.) As indicated in FIG. 5, the new value flag or status may be sent to or used by the summer 108 to perform process modeling in a manner described herein. In another embodiment, the new value flag or status may be sent to and used by the model 105 to determine whether to perform model prediction bias correction during a particular controller scan, as described in more detail below. If, on the other hand, a new value of the process variable is not received at the interface 170, the interface 170 may set the new value flag or status of the process variable to indicate that no new value has been received for or during the current controller scan. In one case, for example, the interface 170 may set the status parameter of the process variable signal (for which no new value has been received) to be "constant" indicating that the stored process variable measurement is constant or unchanged from the last controller scan period. Generally speaking, the interface 170 will operate to detect the presence of a new measurement value for each of the controlled and auxiliary variables CVs and AVs at least once during each scan or execution of the process controller 122 and operates to change, update, or alter the new value flag or status of each measured process variable for each newly received measured variable (CVs and AVs) at least once during a controller scan.

Thereafter, during operation, the summer 108 operates to determine a new error value between the currently measured process variable and a predicted value of that process variable (e.g., the predicted value of the process variable created by the process model 105 during the current or the last controller scan) to determine a model bias correction only when the new value flag is set or the status of the process variable measurement is "good". If the new value flag is not set (for a measured process variable) or the process variable status is "constant", then the summer 108 does not operate to produce a new controller model bias value for the controller model 105 when performing modeling during the controller scan. Alternatively or in addition, the new value flag or process parameter status value may be used to cause the controller model prediction unit 105 to not apply a model bias correction for a particular process variable when producing a prediction for the process variable on the line 109 during that controller scan. In some instances, such as when the model prediction unit 105 does not use an iterative prediction algorithm in which a previous prediction of a process parameter is used to generate a new prediction of the process parameter, the output of the summer 108 may be locked when the new value flag is not set or the status parameter is set to "constant" so that, in this case, the summer 108 always provides the most recently calculated model offset or bias value (based on most recently received process variable measurement and a predicted value for the process variable for the measurement time). Here, the model prediction unit 105 may use this model bias or offset during each controller scan at which a new measurement value is not present at the interface 170 of the controller 120 to produce a new prediction of the process variable.

In another embodiment, a switch unit (not shown in FIG. 5) may receive a previously calculated bias or model error value from the summer 108 and, based on the value of the new value flag or the status parameter of the process variable measurement, may pass either a newly calculated bias or model error value as the residual to the model prediction unit 105 (when a new measurement value has been received) or may pass a previously calculated and latched bias or model error value (when a new measurement value for the process variable has not been received). In this or in any of the other cases described herein, the model prediction unit 105 may use the same or a filtered version of the prediction error bias for each prediction of the process variable produced on the line 109 when no new measurement value for the process variable has been received.

In any event, as a result of the operation of the summer 108, the model prediction unit 105 performs control variable prediction using a measured process parameter value (for one of the controlled variables CVs) to produce a newly calculated bias or controller offset (as created by the summer 108) during the scans at which a newly measured value of the controlled process parameter is received, and uses a previously calculated bias value, or no bias value at all, during the controller scans at which a new value of the process variable being controlled is not received. This operation enables the model prediction unit 105 to still operate to predict controlled values (CVs) during time periods or scans at which no new measured values are received for one or more of the controlled variables.

It will be noted that, as indicated in FIG. 5, the controller 122 may also receive indications of the disturbance variables DV in a wireless (or intermittent or non-periodic) manner from, for example, one or more field devices, an operator interface, a controller, scheduler or optimizer or any other source 174. In these cases, the most recently received values (measured or otherwise) of these variables is latched at an input interface 172 of the controller 122 and is used by the process model prediction unit 105 until a newly received or measured value for these variables is received by or provided to the controller 122.

In one embodiment, the model prediction unit 105 may operate as described below using the same process model during controller scans at which one or more newly measured values of the process parameters (i.e., the controlled or auxiliary variables CVs and AVs) are available at the interface 170 and during controller scans at which one or more measured values of the controlled variables and auxiliary variables are not present at the input interface 170 of the controller 122.

Figure 6:
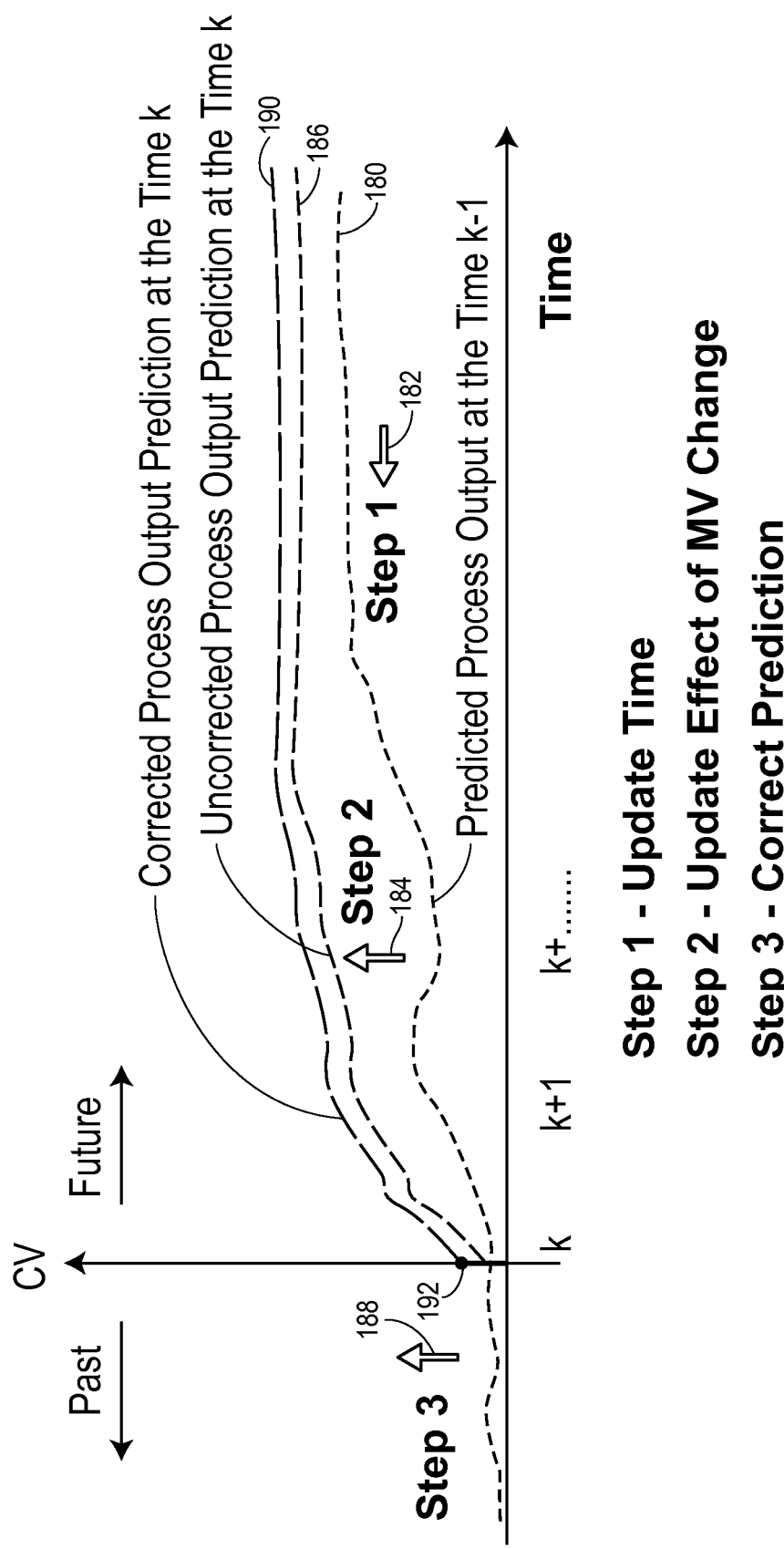
FIG. 6 depicts a graph illustrating the operation of the MPC controller of FIG. 5 for a particular process variable during controller scans at which process variable measurements for the particular process variable are received at the controller.

Generally speaking, in a particular at any time instance or scan time k, the controller 122 updates the process output prediction of the process model prediction unit 105 in three steps, which are illustrated in FIG. 6. At a first step during a new controller scan, the process variable prediction made by the prediction unit 105 at the time k−1 over the time to the time horizon (the bottom dotted curve 180 of FIG. 6) is shifted one scan time to the left, as indicated by the arrow 182 in FIG. 6. This step essentially time aligns a previous process variable prediction (made during a previous controller scan) with the current time so that, for example, the prediction of the process variable for the time k+1 made at the scan time k−1 with respect to the current scan time k, is now aligned with the time k.

Next, a step response on the inputs MV and DV, scaled by the current change on the process input, is added to the output prediction, as indicated by the arrow 184 to produce a new predicted process variable over the time horizon, as indicated by the curve 186 in FIG. 6. In effect, this step uses the process model of the model prediction unit 105 to generate a new set of predictions for the process variable at the current time and at the time k+1 (relative to the current scan time k) out to the time horizon. Next, at the third step, as indicated by the arrow 188, the entire prediction curve is moved or corrected to account for the difference or offset between the previously predicted value of the process variable at the current scan (e.g., the k+1 prediction value of the process variable made at the controller scan associated with the k−1 scan of the controller) and the measured value of the process variable (indicated in the graph of FIG. 6 as the point 192) at that same time (e.g., at time k). In effect, this third step determines a correction amount to be applied to the model prediction curve 186 as the difference between the previously predicted value of the process variable at the current time (during this scan or a previous scan) and the measured process variable value at the current time (point 192). This shift of the process variable prediction curve 186 by the bias amount is illustrated by the line 190 of FIG. 6 and implements model bias correction. Thereafter, the predicted process variable vector defined by the line 190 is provided as the output of the model 109 to the vector summer 114 of FIG. 5. Of course, the controller performs these steps separately for each process variable being controlled, e.g., each of the controlled variables CVs and auxiliary variables AVs.

It will be understood that the wireless MPC controller 122 of FIG. 5 performs the same three steps shown above for updating the process variable prediction at any time that a new wireless measurement for the process variable is available (e.g., when the new value flag is set to indicate a new value for the measured process variable or the status of the process variable measurement is "good"). However, the wireless MPC controller 122 performs only the first two steps when a new wireless measurement is not available at the interface 170, (e.g., when the new value flag is not set or the status of the process variable measurement is set to "constant".) Effectively, the wireless MPC controller 122 uses a process variable prediction at the summer 114 that is uncorrected by a recent measurement value during the controller scans at which a new measurement value is not available, and, uses a corrected prediction value at the summer 114 (corrected to remove process model mismatch bias) only during the controller scans at which a new measurement value is available. Because the correction value (or bias value) is only determined at the times when a new measurement value is available (instead of at every controller scan as in the wired MPC case), the corrections values, when calculated, tend to be larger and thus may result in more significant bumps within the process variable response curve.

In the operation described above, the model prediction unit 105 is iterative in nature because it generates a new process variable prediction vector over the time horizon for a particular process variable by adding predicted changes (caused by the current MVs and DVs at the input of the prediction unit 105) to a previously determined process variable prediction vector (determined at a previous controller scan) to produce a new prediction vector for the current controller scan. As such, each prediction is biased, in some nature, by the bias calculated during the most recent controller scan at which a new measurement was available. This is the reason why generating a new prediction value at each controller scan at which no new measurement is available, without preforming bias correction, can still operate well in spite of controller model mismatch. However, in controller implementations in which the model prediction unit 105 generates a new prediction vector in a non-iterative manner (i.e., not based on an addition to a previously generated predicted vector), the most recently calculated bias value may be applied in those scans during which a new measurement value is not available.

Advantageously, in any case, the ongoing MPC operation is based on the same process model as that used in the wired MPC operation and, as such, no new MPC model needs to be created for the wireless operation. In particular, the MPC controller of FIG. 5 uses an estimate or predicated value of the controlled process variables as output by the model prediction unit 105 when no new measurement value for the process variable is provided to the controller 122 and these estimates are used in the MPC controller 122 to develop the error signal at the output of the vector summer 114. As a result, the process model of the MPC controller estimates control parameters between measurement updates provided by wireless transmitters and these estimates can be used in MPC controller operation.

As a result of this operation, the wireless MPC operation described above works both with wired and wireless measurements, operates at the control scan period defined by the process model, i.e., the scan period for wired operation, applies the simulated value of the measurement obtained from the MPC process model during control calculations at which no new measurement is available, updates its process model using the last good measurement when a measurement is available, and may switch the mode of operation depending on the measurement status or other signal developed internally within the MPC controller. As noted above, in one embodiment, the MPC controller 122 may use different measurement status indications of, for example, "good" and "constant" to indicate when a new measurement for a process variable has been received and when a new measurement for a process variable has not been received, respectively, and these measurement status indications may be applied or used to drive the operation of the model prediction unit 105 and/or the summer 108.

Still further, it will be understood that the operation of the summer 108, the interface 170, and the model prediction unit 105 as described above are performed in the same manner for each of the different process variables being controlled and measured, e.g., for each of the controlled variables CV and auxiliary variables AV. Thus, in some controller scans, one or more of the CV and AV predictions output to the summer 114 may be updated based on new model bias values calculated as a result of newly received measurements for these variables, while the CV and AV predictions of others of the CVs and AVs provided to the summer 114 may not be updated based on new model bias values. Still further, in some controller scans, no new model bias values may be calculated if no new measurement values are received or are available for any of the controlled variables CVs or auxiliary variables AVs during that controller scan. Thus, the description of the calculations and operations performed by the model prediction unit 105, the summer 108 and the interface unit 170 of FIG. 5 are performed separately and individually for each different controlled variable CV and auxiliary variable AV during each scan, so that, during any particular controller scan, some CVs and AVs may be updated based on newly calculated model bias errors while others may not be updated.

Figure 8:
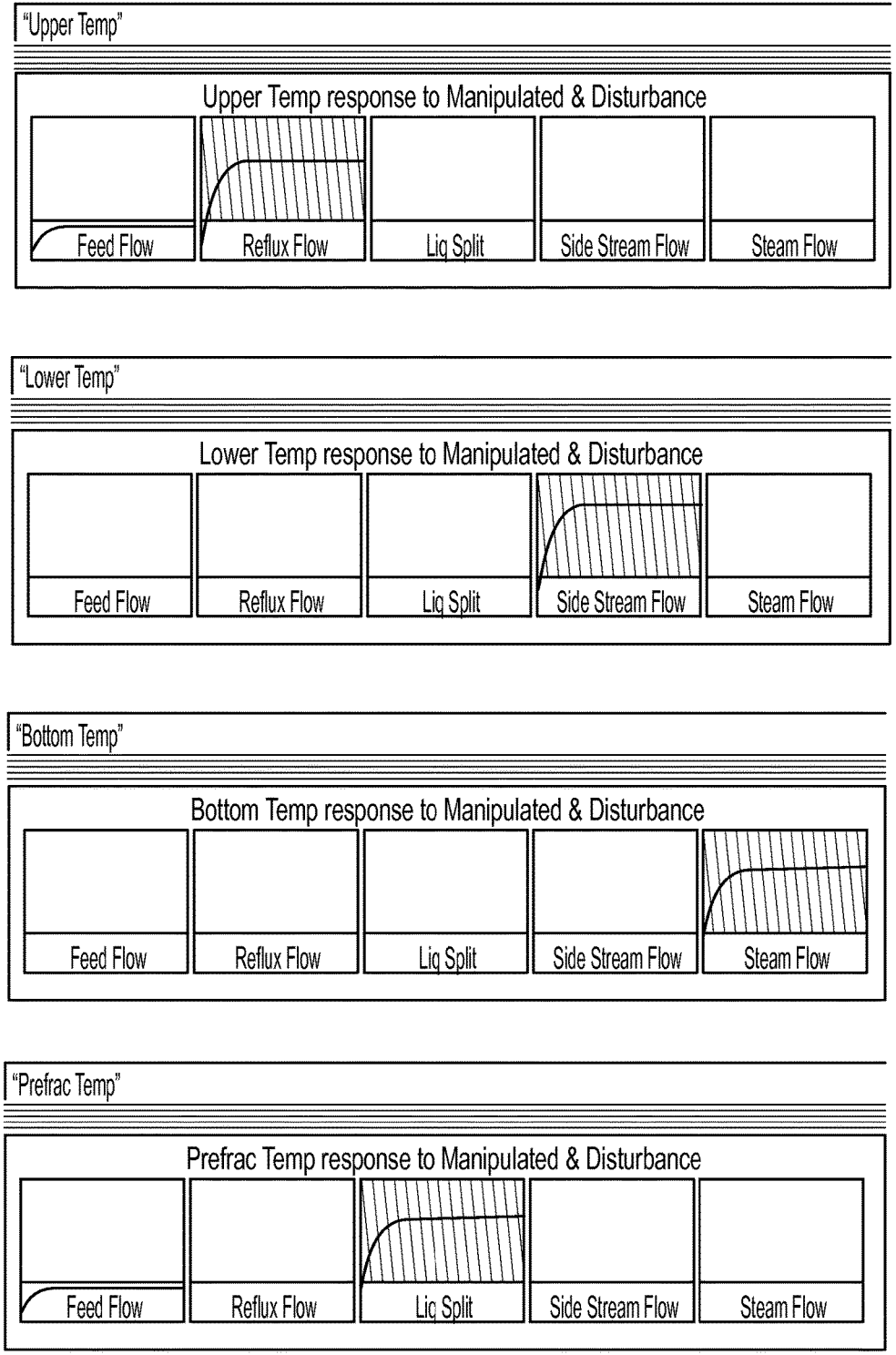
FIG. 8 depicts an example of a set of step response models that may be used to generate an MPC controller algorithm in the MPC controller of FIG. 5.
Figure 9:
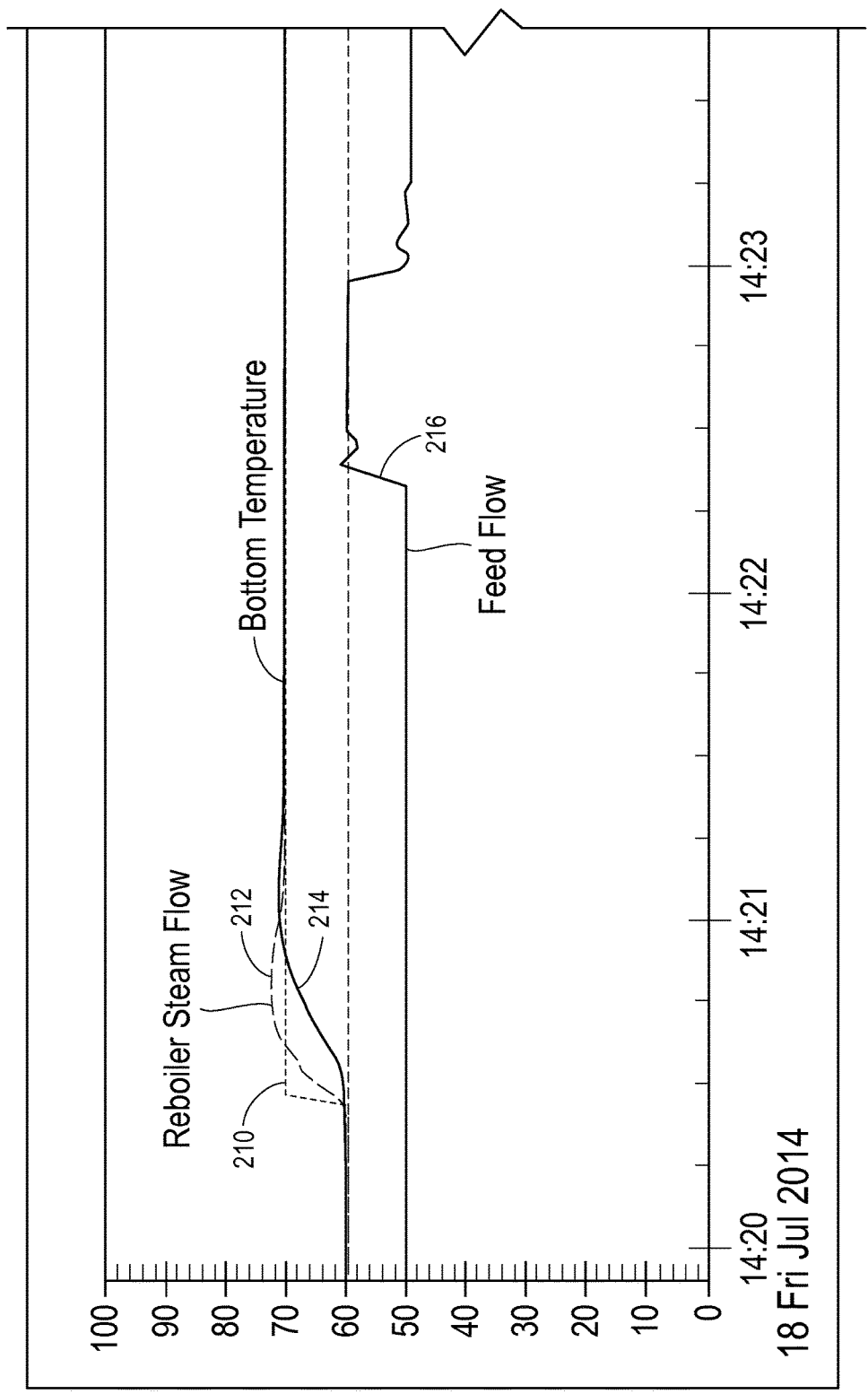
FIG. 9 depicts a graph of a controlled variable value and two manipulated variable values in a wired MPC control system when the MPC control system responds to a step change in a set point for the controlled variable, with measurement oversampling at a one second controller scan rate.
Figure 10A:
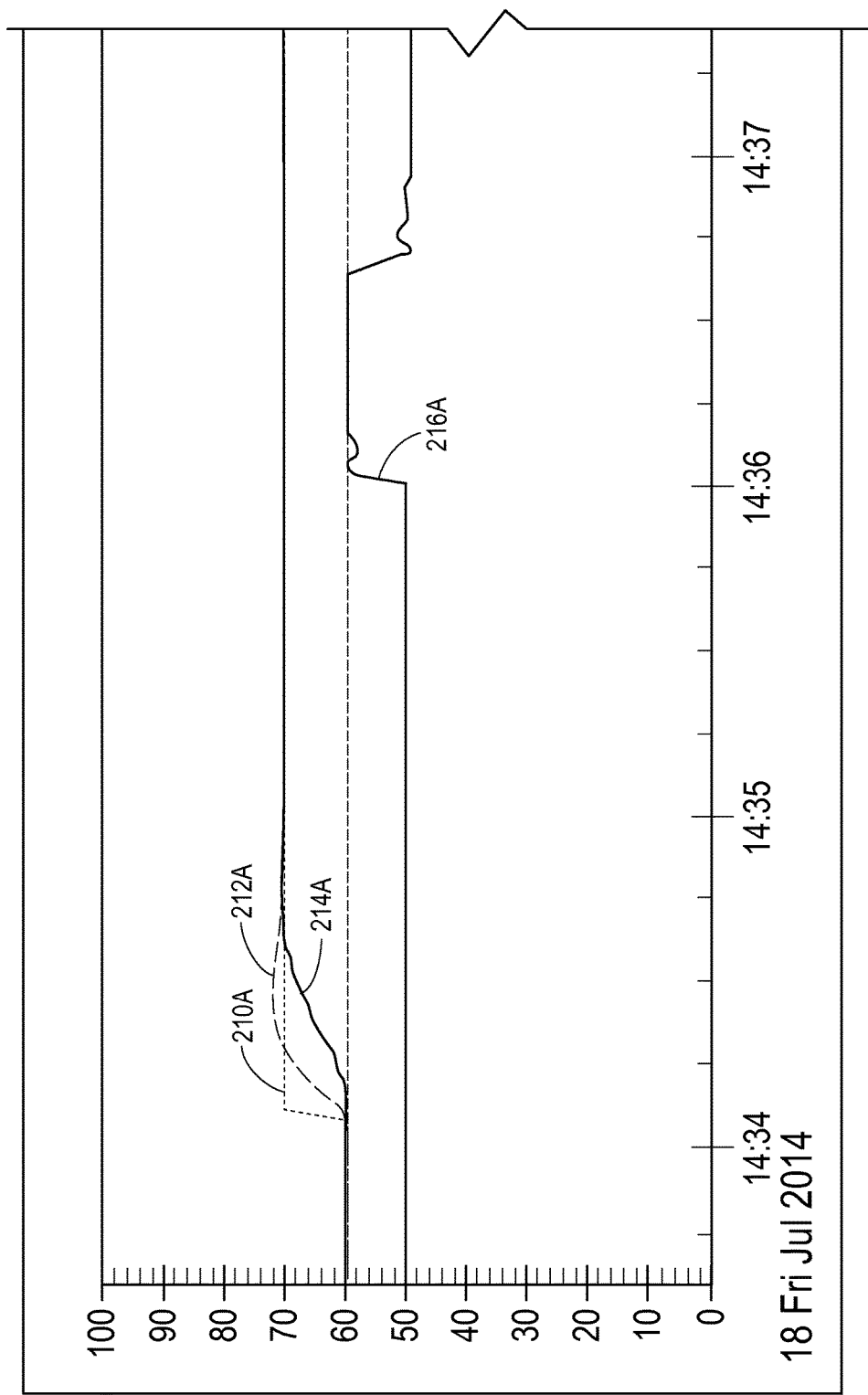
FIG. 10A depicts a graph of the same controlled variable and manipulated variables of FIG. 9, when a wireless MPC control system responds to a step change in a set point for the controlled variable, with the wireless MPC control system having a one second controller scan rate and a measurement update rate for the controlled variable of eight seconds.
Figure 10B:
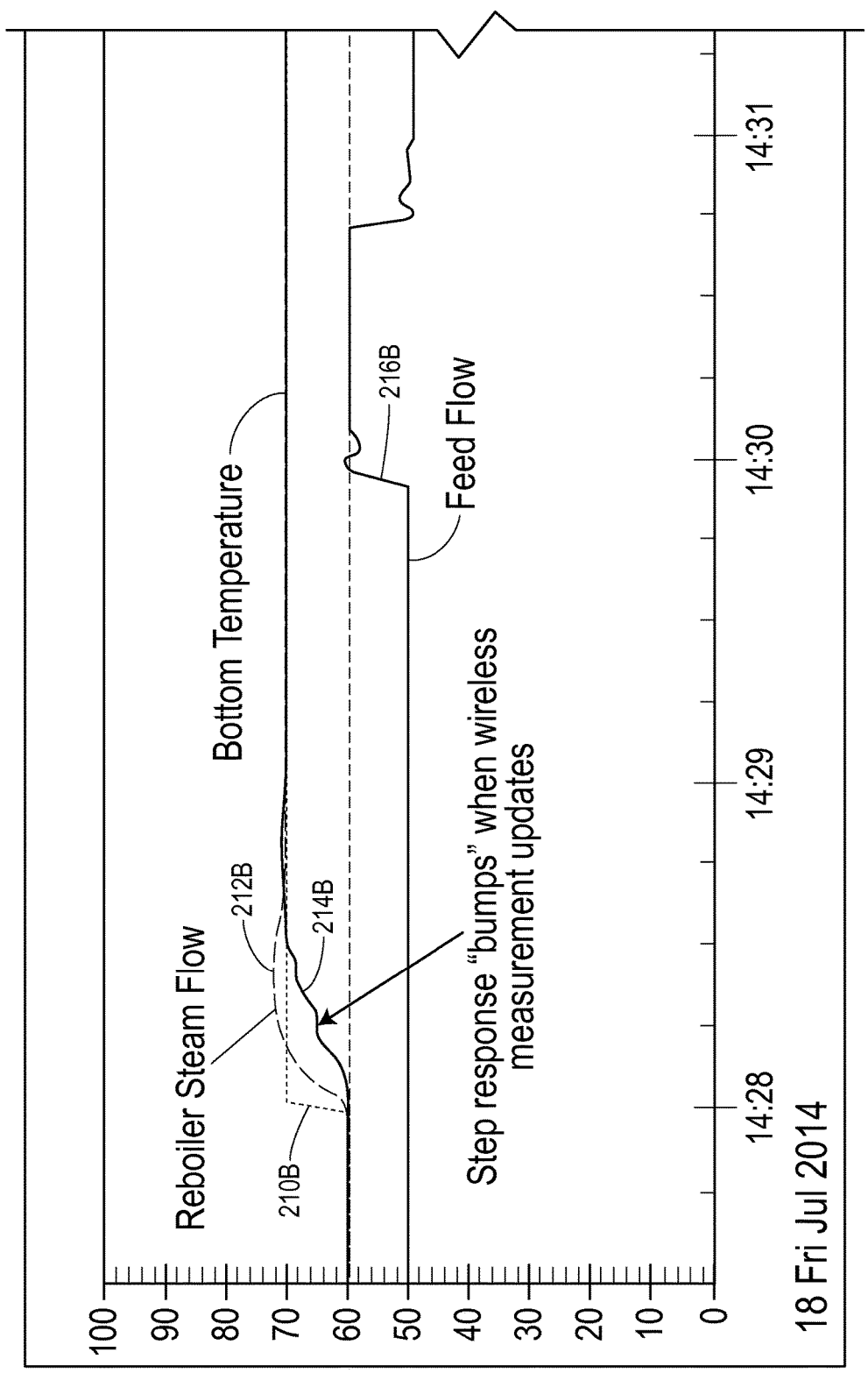
FIG. 10B depicts a graph of the same controlled variable and manipulated variables of FIG. 9, when a wireless MPC control system responds to a step change in a set point for the controlled variable, with the wireless MPC control system having a one second controller scan rate and a measurement update rate for the controlled variable of 16 seconds.

FIGS. 7-10B depict the operation of the MPC controller configured as described in FIG. 5 when used to control a divided wall column having four controlled variables in the form of an upper column temperature (Upper Temp), a lower column temperature (Lower Temp), a bottoms temperature (Bottom Temp) and a prefracing temperature (Prefrac Temp) which are controlled or effected by the manipulated and disturbance variables of a reflux flow (Reflux Flow), a side stream flow (Side Stream Flow), a reboiler steam flow (Reboiler Steam flow), a liquid split (Liquid Split) and a feed flow (Feed Flow). In particular, FIG. 7 illustrates a simplified process model used in the model prediction unit 105 of the configuration of FIG. 5, while FIG. 8 illustrates step response curves used to developed the control matrix used in the control algorithm unit 116 of FIG. 5. FIGS. 9 and 10A and 10B illustrate the response of one of the controlled variables, i.e., the bottom temperature, to a ten percent change of the set point of the bottom temperature over 10 seconds and to a feed flow increase of ten percent over 10 seconds using a wired MPC (with oversampling of bottom temperature measurements), and with wireless MPC operation at two different sampling rates for the bottom temperature measurements and a controller scan rate of one second. In particular, FIG. 10A illustrates the response of the controller at an eight second periodic measurement sampling rate for the bottom temperature, while FIG. 10B illustrates the response of the controller at a 16 second periodic measurement sampling rate for the bottom temperature.

As illustrated in FIG. 9, in response to the step response change of the set point (ten percent over ten seconds) for the bottom temperature (line 210), the controller 122 changes the reboiler steam flow setting (line 212) to control the bottom temperature. As is evident from the process model of FIG. 7, the reboiler steam flow is the manipulated variable primarily associated with changing the bottom temperature. The bottom temperature rises over time as illustrated in FIG. 9 by the line 214 in response to typical MPC control performed by the controller. Likewise, in response to a ten percent change in the feed flow manipulated variable (line 216), no change is detected in the bottom temperature line 214, which is expected given the process model of FIG. 7 (wherein feed flow has no effect on bottom temperature).

FIGS. 10A and 10B, on the other hand, illustrate the same parameters when controlled using the MPC controller of FIG. 5 with significant under sampling (as compared to the controller scan rate) for at least the bottom temperature measurement. As will be seen in FIGS. 10A and 10B, the response lines 214A, 214B of the bottom temperature are similar to the line 214 of FIG. 9, except that these lines exhibit a less smooth response, which makes the lines 214A and 214B appear to have "bumps." These bumps occur as a result of or in response to the receipt of measurements at the controller for the bottom temperature and are a result of the model prediction bias correction being applied only at these points (i.e., at the times that the measurement samples for the bottom temperature variable are received at the controller).

In summary, using a simplified DWC process model as shown in FIG. 7, the operation of wired MPC (FIG. 9) and of the wireless MPC (FIGS. 10A and 10B) were tested at two different sampling rates for one of the controlled variables. Based on these results, it is clear that the operation of the wireless MPC configuration provides stable operation even with a measurement transmission scan period being many times greater than the MPC operational scan period. Performance for wired MPC and wireless MPC with measurement scan periods eight and 16 times longer than the wired MPC scan period are compiled in Table 1 below. As can be seen, the integrated absolute error (IAE) on set point changes for wireless MPC in any case does not exceed the IAE for wired MPC by more than 10%, which is a very insignificant performance change. As illustrated in FIGS. 10A and 10B, the step response trend of wireless MPC shows small "bumps" when a new measurement value is transmitted and the process variable prediction is corrected for prediction model bias. Generally, the "bump" size depends on the model accuracy and the unmeasured disturbances affecting the trended process output but does not lead to significantly poorer performance over the wired MPC configuration.

TABLE 1

| Set Point Change - 10% | IAE-Wired MPCScan Period - 1 sec | IAE-Wireless MPC Update Period - 8 sec | IAE-Wireless MPC Update Period - 16 sec |
| --- | --- | --- | --- |
| Upper Temperature | 126.05 | 133.2 | 135.1 |
| Prefrac Temperature | 403.6 | 412.5 | 412.9 |
| Lower Temperature | 129.5 | 136.0 | 140.1 |
| Bottom Temperature | 81.4 | 88.7 | 88.2 |

Still further, the MPC technique described herein can be used to implement what is, in effect, a multi-rate MPC controller in which different process variables, which have different measurement update rates, are controlled by the same MPC controller. In effect, the MPC controller uses feedback measurements for different ones of the controlled variables CVs and auxiliary variables AVs received at different update rates or at different intermittent times to perform control. In this case, the multi-rate controller will update the predicted output of each controlled and auxiliary variable with a new model bias offset at the rate at which new measurements are received for that variable, and will use predicted values of those variables that are not updated with new model bias offsets at the controller scans associated with the faster rate variables at which new measurements for the slower rate variables are not present.

Generally speaking, multi-rate MPC uses a process model that combines or implements several sub-models with significantly different dynamics and/or measurement update scan periods. Such a process model may be a single process model, such as an MPC model, that may simultaneously model the operation of several process parameters or control loops, or may be a set of models that model different aspects of process operation or process control loops, such as a flow model, a pressure model, a material composition model, a temperature model, etc., which can each be run at any particular controller scan. During operation, each of the models is implemented at each controller scan. However, the fastest sub-model uses a measurement at every scan, such as at every MPC scan, while the slower sub-models use model simulated values when the fast scan does not coincide with the slower update scans. In this case, the slower models are still implemented at the scan rate of the fastest model to provide predicted values for the process variables associated with these models during the scans at which no new measurements values have been received. However, the slower models are only updated or corrected (e.g., for model bias) when new measurements are received for the process variables being modeled by these slower scan rate models. Thus, the fast scan rate models will still run but will use process variables predicted by the slower models at the scan times at which a new process variable measurement for the slow models are not available. When the fastest scan measurements coincide with the slower scan measurements, the real measurements for both models are used and both models update the predicted simulated values to correct for model bias error, for example.

Figure 11:
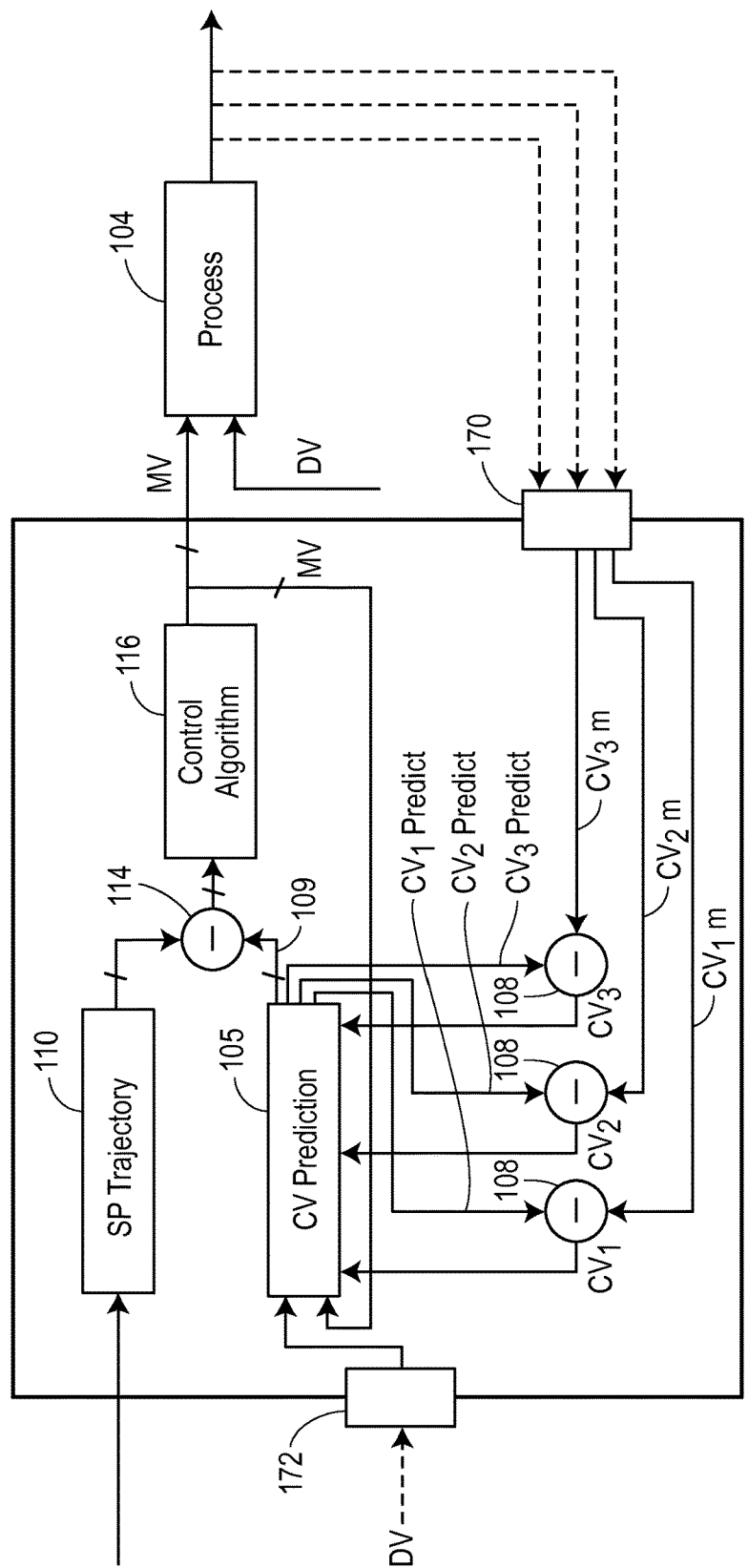
FIG. 11 depicts a multi-rate controller, such as that of FIG. 5, that implements multiple different control signal update loops at different rates based on measurement updates received at different rates.
Figure 12:
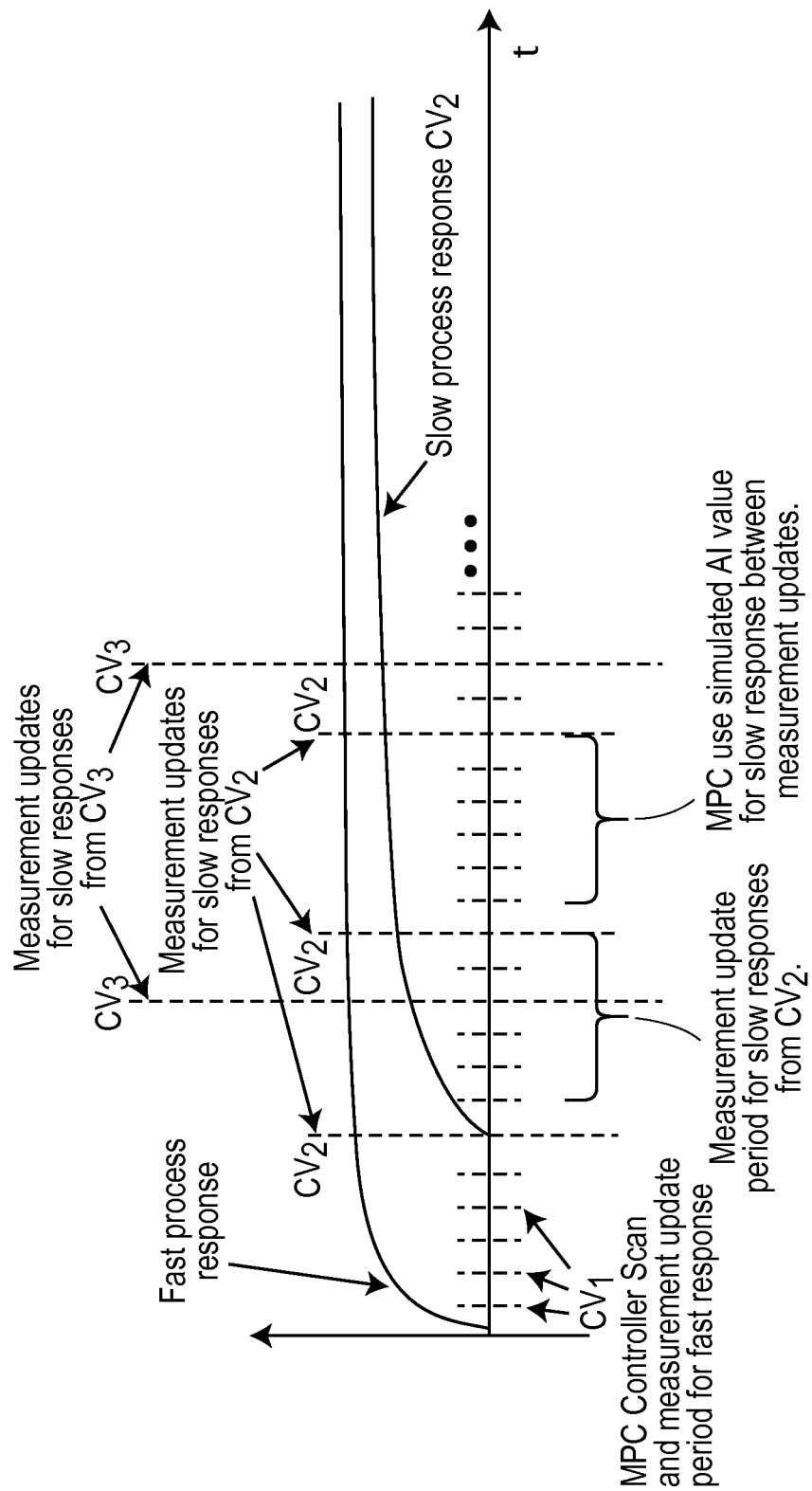
FIG. 12 depicts a graph illustrating responses curves of multiple different controlled variables in a multi-rate controller, such as that of FIG. 11.

As an example, FIG. 11 illustrates a multi-rate controller having three controlled variables for which measurement updates are received at different update rates. In this case, the interface 170, the summers 108 and the model prediction unit(s) 105 operate the same as that described above in FIG. 5. Here, different summers 108 are illustrated as receiving process variable measurements $CV_1m$, $CV_2m$, and $CV_3m$ from the interface 170. Moreover, while not shown in FIG. 11, the new value flag or status indications described above may be incorporated into the operation of the each of the summers 108 and/or the model prediction unit 105 in the manners described above with respect to FIG. 5 for each of the process variables $CV_1$, $CV_2$, and $CV_3$. In the embodiment of FIG. 11, the MPC controller 122 essentially operates at the fastest update rate or has a controller scan rate that is the same as, or maybe even faster than (or possibly slower than) the fastest update rate associated with the controlled variable $CV_1$. As illustrated by the chart of FIG. 12, the controller 122 receives a new measurement of the controlled variable $CV_1$ during or for each controller scan, but only receives a new measurement of the controlled variable $CV_2$ every $6^{th}$ controller scan and receives a new measurement of the controlled variable $CV_3$ every $10^{th}$ controller scan. (While this example illustrates periodic receipt of process variable measurements, the process variable measurements may be non-periodic or intermittent as well). During operation, the controller 122, which may be the same as that of FIG. 5, operates during each controller scan to use the model prediction unit 105 to create a prediction of each of the controlled variables $CV_1$, $CV_2$, and $CV_3$ and to thereby create a new set of manipulated variables MVs (or control signals) to be supplied to the process 104 for each controller scan. However, during the controller scans at which no new measurement values are available for the second and third controlled variables, $CV_2$ and $CV_3$, the prediction of these variables as output by the model prediction unit 105 is not updated with a new model bias correction, even though the prediction of the controlled variable $CV_1$ is corrected in this manner.

Of course, the controller 122 operates to update each controlled variable prediction vector with a new model bias correction during the scans at which new measurement values for these variables are received or are available at the controller 122. This operation, in effect, enables the MPC controller 122 to control each of the controlled variables at a different effective scan and/or measurement rate, while maintaining overall control of the process during each scan. This effect is illustrated in FIG. 12, in which the response to a set point change in the first and second controlled variables $CV_1$ and $CV_2$ are illustrated. For the sake of illustration only, no response to a set point change for the controlled variable $CV_3$ is illustrated in FIG. 12. However, such a response would typically be slower than that illustrated for $CV_1$ and $CV_2$ based on the slower measurement update rate for the controlled variable $CV_3$. As can be seen, because the controlled variable $CV_1$ is actually controlled at a faster effective scan rate due to the faster measurement feedback of this variable, the controller 122 is able to respond to or implement a change of the first controlled variable $CV_1$ more quickly than to a change of the second controlled variable $CV_2$. However, the controller 122 is also able to control the second controlled variable $CV_2$ well despite the slower measurement rate of this variable. In this manner, the controller 122 is able to implement control of different process variables or controlled variables at different effective rates and thus does not need measurement signals to be received for each controlled variable at the same or even similar rates.

This multi-rate operation is very useful in certain processes in which different controlled variables have different, and sometimes vastly different, process control loop dynamics and, in particular, different response time dynamics. For example, a flow control loop may need to change a manipulated variable much more quickly than a pressure control loop or a temperature control loop (due to the physical differences in the manner in which flow, temperature and pressure can change in a process based on some control action). Moreover, a material composition loop may need to change manipulated variables even more slowly than a temperature loop. As a result, because of the sometimes vastly different response times associated with these control loops, it may not be necessary to control each of these loops at the same effective scan rate. As a result, it may also not be necessary to receive feedback signals for each of the controlled variables of these loops at the same rate (which has typically been the fastest rate associated with the most dynamic control loop), which can significantly decrease the communication load on a communications network of a process control system in which each of these loops is being implemented.

Thus, as will be understood, multi-rate MPC uses a model that combines several sub-models with different scan periods or scan rates. During operation, the fastest sub-model uses a measurement at, for example, every MPC scan, while the slower sub-models use model simulated values if the fast scan time does not coincide with the receipt of a measurement associated with the slower scans. When the fastest scan time coincides with one or more of the slower scans (i.e., measurement times of the slower loop), the both or all of the real measurements are used and both or all of the models are updated to provide predicted simulated values.

While the multi-rate MPC controller has been described herein as implementing a fastest scan rate at the same rate as the receipt measurement values for one of the controlled variables, the multi-rate MPC controller could instead, implementing the techniques described above, execute at a scan rate that is slower than or faster than the update rate of the fastest controlled variable. Typically, however, the multi-rate controller will operate at a scan rate that is faster than the measurement update rate of at least one of the controlled variables being controlled by the MPC controller.

Some improvement in the above MPC techniques may be achieved by correcting internally modeled parameter values in the wireless MPC in between measurement transmissions. The values of corrections may be calculated by the MPC controller and adjusted adaptively during operation, as an example.

In any event, as will be understood, the wireless MPC configuration described herein is able to operate when the measurement scan period of one or more of the controlled variables is significantly larger than the MPC controller scan period. The wireless MPC can also operate when wireless measurements are delivered at irregular intervals. Generally speaking, as described above, the wireless MPC uses its own internal model for simulating process parameter values for one or more controlled variables in periods when no new measurements are transmitted for these controlled variables. When a new measurement is available, a model prediction and simulated parameter values are updated. This wireless MPC operation provides a continuity of operation, independent of irregular measurements.

Practice of the control techniques described herein is not limited to use with MPC control routines, but rather may be applied in a number of different multiple-input and/or multiple-output control schemes and cascaded control schemes. More generally, the control technique may also be applied in the context of any closed-loop model-based control routine involving one or more process variables, one or more process inputs or other control signals.

The term "field device" is used herein in a broad sense to include a number of devices or combinations of devices (i.e., devices providing multiple functions, such as a transmitter/actuator hybrid), as well as any other device(s) that perform(s) a function in a control system. In any event, field devices may include, for example, input devices (e.g., devices such as sensors and instruments that provide status, measurement or other signals that are indicative of process control parameters such as, for example, temperature, pressure, flow rate, etc.), as well as control operators or actuators that perform actions in response to commands received from controllers and/or other field devices such as valves, switches, flow control devices, etc.

It should be noted that any control routines or modules described herein may have parts thereof implemented or executed in a distributed fashion across multiple devices. As a result, a control routine or module may have portions implemented by different controllers, field devices (e.g., smart field devices) or other devices or control elements, if so desired. Likewise, the control routines or modules described herein to be implemented within the process control system may take any form, including software, firmware, hardware, etc. Any device or element involved in providing such functionality may be generally referred to herein as a "control element," regardless of whether the software, firmware, or hardware associated therewith is disposed in a controller, field device, or any other device (or collection of devices) within the process control system. A control module may be any part or portion of a process control system including, for example, a routine, a block or any element thereof, stored on any computer readable medium. Such control modules, control routines or any portions thereof (e.g., a block) may be implemented or executed by any element or device of the process control system, referred to herein generally as a control element. Control routines, which may be modules or any part of a control procedure such as a subroutine, parts of a subroutine (such as lines of code), etc., may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controllers described herein may be configured to implement a control strategy or control routine in any desired manner.

Alternatively or additionally, the function blocks may be stored in and implemented by the field devices themselves, or other control elements of the process control system, which may be the case with systems utilizing Fieldbus devices. While the description of the control system is provided herein using a function block control strategy, the control techniques and system may also be implemented or designed using other conventions, such as ladder logic, sequential function charts, etc. or using any other desired programming language or paradigm.

When implemented, any of the software described herein may be stored in any computer readable memory such as on a magnetic disk, a laser disk, flash memory, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other wired or wireless local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it may be apparent to those of ordinary skill in the art that changes, additions or deletions may be made to the control techniques without departing from the spirit and scope of the invention.

The invention claimed is:

1. A process controller for use in controlling a set of process equipment performing a process, comprising:
   a set point input that receives a set point for a controlled process variable within the process;
   a process variable input that receives measured values of the controlled process variable;
   a process model that produces one or more predicted values of the controlled process variable during each of a number of execution cycles;
   a control signal generator coupled to the process model and to the set point input that operates during each of the number of execution cycles to use the set point and the one or more predicted values of the controlled process variable produced by the process model during the execution cycle to produce a control signal for controlling the process equipment to thereby drive the controlled process variable towards the set point; and a model bias correction unit coupled to the process variable input and to the process model, wherein the model bias correction unit determines a model correction to be applied by the process model to produce the predicted values of the controlled process variable;

wherein the control signal generator and the process model operate successive execution cycles at an execution rate;

wherein the process variable input receives measured values of the controlled process variable at a rate less than the execution rate of the control signal generator and the process model;

wherein the model bias correction unit produces a new model correction based on a previously predicted value of the controlled process variable for a particular time and a newly received measured value of the controlled process variable for the particular time during an execution cycle associated with the receipt of a new measured value of the controlled process variable at the process variable input;

wherein the process model offsets one or more calculated predicted controlled process variable values with the new model correction to produce the one or more predicted values of the controlled process variable only during the execution cycle associated with the receipt of the new measured value of the controlled process variable at the process variable input;

wherein the process model produces, during each execution cycle, a predicted value of the controlled process variable at one or more future times over a time horizon; and wherein the process model offsets each of the predicted values of the controlled process variable at the one or more future times over the time horizon with the model correction during the execution cycles associated with receipt of a new measured value of the controlled process variable at the process variable input.

2. The process controller of claim 1, wherein the execution rate of the control signal generator and the process model is a periodic execution rate.

3. The process controller of claim 1, wherein the model bias correction unit only produces a new model correction during the execution cycle associated with the receipt of a new measured value of the controlled process variable at the process variable input.

4. The process controller of claim 3, wherein the process model uses a previously calculated value of the model correction during execution cycles that are not associated with the receipt of a new measured value of the controlled process variable.

5. The process controller of claim 1, wherein the process model is an iterative process model that uses a previously calculated predicted value of the controlled process variable to produce a new predicted value of the controlled process variable during each execution cycle, and wherein the process model applies the new model correction to the new predicted value of the controlled process variable only during execution cycles associated with the receipt of a new measured value of the controlled process variable at the process variable input.

6. The process controller of claim 1, wherein the process variable input receives a new measured value of the controlled process variable at a periodic rate less than the execution rate of the control signal generator and the process model.

7. The process controller of claim 1, wherein the process variable input receives a new measured value of the controlled process variable at a non-periodic rate.

8. The process controller of claim 1, wherein the process variable input receives a new measured value of the controlled process variable at an intermittent rate.

9. The process controller of claim 1, further including a status generator, wherein the status generator indicates that the controller is in a first non-error status state for the execution cycles at which no new measured value of the controlled process variable has been received at the process variable input, and indicates that the controller is in a second non-error status state for the execution cycles at which a new measured value of the controlled process variable has been received at the process variable input.

10. The process controller of claim 1, wherein the control signal generator is a model predictive controller.

11. The process controller of claim 1, wherein the process variable input includes a flag generation unit that generates a flag indicating the receipt of a new measured value of the controlled process variable and wherein the process model uses the flag to determine which execution cycles are associated with the receipt of a new measured value of the process variable at the process variable input.

12. A method of controlling a process, comprising:
implementing, on a computer processing device, multiple execution cycles of a control routine at an execution rate to generate a control signal for controlling the process during each execution cycle, including;
during each execution cycle of the control routine,
executing, on the computer processing device, a process model to produce one or more predicted values of a controlled process variable within the process; and
determining, on the computer processing device, a control signal for use in controlling the process to thereby control the controlled process variable, including using a set point and the one or more predicted values of the controlled process variable produced by the process model during the execution cycle to produce the control signal; and
further including adjusting the one or more predicted values of the controlled process variable prior to use in determining the control signal during some of the execution cycles including,
receiving a new measured value of the controlled process variable at a rate less than the execution rate;
determining, via the computer processing device, a new model bias correction to be applied to the one or more predicted values of the controlled process variable, including producing the new model bias correction based on a previously predicted value of the controlled process variable for a particular time and a newly received measured value of the controlled process variable for the particular time during an execution cycle associated with the receipt of a new measurement value of the controlled process variable;
adjusting the one or more of the predicted values of the controlled process variable developed by the process model with the new model bias correction to produce one or more corrected predicted values of the controlled process variable values only during the execution cycles associated with the receipt of the new measured value of the process variable;

wherein executing the process model includes producing, during each execution cycle, a predicted value of the controlled process variable at one or more future times over a time horizon; and wherein adjusting the one or more of the predicted values of the controlled process variable developed by the process model with the model bias correction includes offsetting each of the predicted values of the controlled process variable at the one or more future times over the time horizon with the model bias correction during the execution cycles associated with receipt of a new measured value of the controlled process variable.

13. The method of claim 12, wherein determining a new model bias correction to be applied to the one or more predicted values of the controlled process variable includes determining the new model bias correction only during the execution cycles associated with the receipt of a new measured value of the controlled process variable.

14. The method of claim 12, further including using a previously calculated value of the model bias correction during execution cycles that are not associated with the receipt of a new measured value of the controlled process variable to adjust the one or more predicted values of the controlled process variable.

15. The method of claim 12, wherein executing a process model to produce one or more predicted values of a controlled process variable includes executing an iterative process model that uses a calculated predicted value of the controlled process variable from a previous execution cycle to produce a new predicted value of the controlled process variable for the current execution cycle, and including adjusting the one or more predicted values of the controlled process variable developed by the process model for the current execution cycle with the model bias correction to produce one or more corrected predicted values of the controlled process variable only during the execution cycles associated with the receipt of the new measured value of the controlled process variable.

16. The method of claim 12, wherein receiving a new measured value of the controlled process variable at a rate less than the execution rate includes receiving a new measured value of the controlled process variable at a periodic rate less than the execution rate.

17. The method of claim 12, wherein receiving a new measured value of the controlled process variable at a rate less than the execution rate includes receiving a new measured value of the controlled process variable at a non-periodic rate.

18. The method of claim 12, wherein receiving a new measured value of the controlled process variable at a rate less than the execution rate includes receiving a new measured value of the controlled process variable at an intermittent rate.

19. The method of claim 12, further including generating, using the computer processing device, a status indication that indicates a first non-error status state for the execution cycles at which a new process variable measurement has not been received, and indicates a second non-error status state for the execution periods at which a new process variable measurement has been received.

20. The method of claim 12, wherein determining a control signal for use in controlling the process includes using, on the computer processing device, a model predictive control routine to generate the control signal.

21. The method of claim 12, further including generating, using the computer processing device, a flag indicating the receipt of a new measured value of the controlled process variable upon receiving a new measured value of the controlled process variable and using the flag to determine which execution cycles are associated with the receipt of a new measured value of the controlled process variable.

22. A device for controlling a process, comprising:
a processor;
a communication interface coupled to the processor to receive a process variable measurement;
a computer readable medium; and
a control routine stored on the computer readable medium that executes on the processor to produce a control signal for controlling a controlled process variable of the process, wherein the control routine serially executes a plurality of execution cycles at an execution rate to generate a new value of the control signal during each execution cycle and wherein the control routine includes;
a process model that executes on the processor during each of the plurality of execution cycles to produce one or more predicted values of the controlled process variable;
a control signal generator coupled to the process model that executes on the processor during each of the plurality of execution cycles to use a set point and the one or more predicted values of the controlled process variable produced by the process model during the execution cycle to produce the control signal; and
a model bias correction unit coupled to the communication interface and to the process model, wherein the model bias correction unit executes on the processor to determine a model correction to be applied by the process model to produce the predicted values of the controlled process variable;
wherein the communication interface receives a new measured value of the controlled process variable at a rate less than the execution rate of the control routine;
wherein the model bias correction unit produces a new model correction based on a previously predicted value of the controlled process variable for a particular time and a new measured value of the controlled process variable for the particular time during an execution cycle associated with the receipt of the new measured value of the controlled process variable at the communication interface;
wherein the process model uses the new model correction to produce the one or more predicted values of the controlled process variable during the execution cycles associated with the receipt of the new measured value of the controlled process variable at the communication interface and uses a previously calculated model correction to produce the one or more predicted values of the controlled process variable during the execution cycles other than the execution cycles associated with the receipt of the new measured value of the controlled process variable;
wherein the process model produces, during each execution cycle, a predicted value of the controlled process variable at one or more future times over a time horizon; and
wherein the process model offsets each of the predicted values of the controlled process variable at the one or more future times over the time horizon with the new model correction during the execution cycles associated with receipt of a new measured value of the controlled process variable.

23. The device of claim 22, wherein the process model is an iterative process model that uses a predicted value of the controlled process variable determined during a previous execution cycle to produce a new predicted value of the controlled process variable during a current execution cycle, and wherein the process model uses the new model correction to adjust the new predicted value of the controlled process variable determined during the current execution cycle only during the execution cycles associated with the receipt of the new measured value of the controlled process variable and wherein the process model uses a previously calculated model correction to produce the one or more predicted values of the controlled process variable values during execution cycles not associated with the receipt of the new measured value of the controlled process variable by not adjusting the new predicted value of the controlled process variable determined during the current execution cycle.

24. The device of claim 23, wherein the execution rate of the control routine is a periodic execution rate.

25. The device of claim 23, wherein the model bias correction unit only produces a new model correction during the execution cycles associated with the receipt of a new measured value of the controlled process variable at the communication interface.

26. The device of claim 23, wherein the communication interface receives a new measured value of the controlled process variable at a periodic rate less than the execution rate of the control routine.

27. The device of claim 23, wherein the communication interface receives a new measured value of the controlled process variable at a non-periodic rate.

28. The device of claim 23, further including a status generator, wherein the status generator executes on the processor to indicate a first non-error status state for the execution cycles at which no new measured value for the controlled process variable has been received at the communication interface, and indicates a second non-error status state for the execution cycles at which a new measured value of the controlled process variable has been received at the process variable input.

29. The device of claim 23, wherein the control signal generator is a model predictive controller.

30. The device of claim 23, wherein the communication interface executes on the processor to generate a flag indicating the receipt of a new measured value of the controlled process variable at the communication interface and wherein the control routine uses the flag to determine which execution cycles are associated with the receipt of a new measured value of the controlled process variable at the communication interface.

31. A multi-rate controller for simultaneously controlling a plurality of controlled process variables in a process, comprising:
a process variable input that receives measured values of each of the plurality of controlled process variables;
a process model that produces one or more predicted values of the each of the plurality of controlled process variables during each of a number of execution cycles;
a control signal generator coupled to the process model that operates during each of the number of execution cycles to use a set point for each of the plurality of controlled process variables and the one or more predicted values of the each of the plurality of controlled process variables produced by the process model during the execution cycle to produce one or more control signals for controlling the process; and
a model bias correction unit coupled to the process variable input and to the process model, wherein the model bias correction unit determines a different model correction for each of the plurality of controlled process variables, wherein the different model corrections are used by the process model to produce the one or more predicted values of the different ones of the plurality of controlled process variables;
wherein the control signal generator and the process model operate execution cycles at an execution rate;
wherein the process variable input receives a new measured value of at least one of the controlled process variables at a rate less than the execution rate of the control signal generator and the process model;
wherein the model bias correction unit produces a new model correction for the plurality of controlled process variables based on a previously predicted value of the controlled process variable for a particular time and a newly received measured valued of the controlled process variables for the particular time during execution cycles associated with the receipt of a new measured value of the controlled process variables at the process variable input;
wherein the process model offsets one or more calculated predicted process variable values of a particular controlled process variable with the new model correction for the particular controlled process variable to produce the one or more predicted values of the particular controlled process variable values only during the execution cycles associated with the receipt of the new measured value of the controlled process variable for the particular controlled process variable at the process variable input;
wherein the process model produces, during each execution cycle, a predicted value for the each of the controlled process variables at one or more future times over a time horizon; and
wherein the process model offsets each of the predicted values of a particular one of the controlled process variables at the one or more future times over the time horizon with the model correction for the particular one of the controlled process variables during the execution cycles associated with receipt of a new measured value of the particular controlled process variable at the process variable input.

32. The multi-rate controller of claim 31, wherein the process variable measurements of different ones of the plurality of controlled process variables are received at different rates.

33. The multi-rate controller of claim 31, wherein the process variable measurements of each of at least two or more of the plurality of controlled process variables are received at a non-periodic rates.

34. The multi-rate controller of claim 31, wherein the process variable measurements of at least one of the plurality of controlled process variables are received at rate that is equal to or greater than the execution rate.

35. The multi-rate controller of claim 31, wherein the model bias correction unit for a particular one of the controlled process variables only produces a new model correction for the particular one of the controlled process variables during the execution cycle associated with the receipt of a new measured value of the particular one of the controlled process variables.

36. The multi-rate controller of claim 31, wherein the process model is an iterative process model that uses a previously calculated predicted value of each of the controlled process variables to produce a new predicted value for each of the controlled process variables during each execution cycle, and wherein the process model applies the new model correction for any particular controlled process variable to the new predicted value of the particular controlled process variable only during execution cycles associated with the receipt of a new measured value of the particular controlled process variables.

37. The multi-rate controller of claim 31, wherein the control signal generator is a model predictive controller.

* * * * *